US010117177B2

(12) United States Patent
Quan et al.

(10) Patent No.: US 10,117,177 B2
(45) Date of Patent: Oct. 30, 2018

(54) METHOD AND RELATED EQUIPMENT FOR SENDING SIGNALING

(71) Applicant: Huawei Technologies Co., Ltd., Shenzhen (CN)

(72) Inventors: Wei Quan, Beijing (CN); Jian Zhang, Beijing (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/598,151

(22) Filed: May 17, 2017

(65) Prior Publication Data
US 2017/0257825 A1 Sep. 7, 2017

Related U.S. Application Data

(63) Continuation of application No. 14/616,346, filed on Feb. 6, 2015, now Pat. No. 9,681,376, which is a (Continued)

(30) Foreign Application Priority Data

Aug. 6, 2012 (WO) ................ PCT/CN2012/079743

(51) Int. Cl.
*H04W 4/00* (2018.01)
*H04W 52/02* (2009.01)
(Continued)

(52) U.S. Cl.
CPC ... *H04W 52/0216* (2013.01); *H04W 52/0212* (2013.01); *H04W 52/0254* (2013.01);
(Continued)

(58) Field of Classification Search
USPC ....... 370/338, 328, 310, 318, 321, 330, 331, 370/347, 447, 448, 449, 450, 451, 455,
(Continued)

(56) References Cited

U.S. PATENT DOCUMENTS

2008/0194280 A1 8/2008 Thurfjell et al.
2011/0126037 A1 5/2011 Jin et al.
(Continued)

FOREIGN PATENT DOCUMENTS

CN 1642033 A 7/2005
CN 101730249 A 6/2010
(Continued)

OTHER PUBLICATIONS

"Discussion on UE power preference indication," 3GPP TSG RAN WG2, Meeting #79,Qingdao, China, R2-123512, 3rd Generation Partnership Project, Valbonne, France (Aug. 13-17, 2012).
(Continued)

*Primary Examiner* — Phuongchau Ba Nguyen
(74) *Attorney, Agent, or Firm* — Leydig, Voit & Mayer, Ltd.

(57) ABSTRACT

The present invention relates to the field of communications, and in particular, to a method and related equipment for sending signaling. The method includes: when a power consumption preference of a user equipment is changed to lower power consumption, determining whether a first timer used for restricting sending of a lower power consumption preference indication expires, and if a determination result is yes, sending a lower power consumption preference indication to a base station; and when the power consumption preference of the user equipment is changed to higher power consumption, sending a higher power consumption preference indication to the base station, or determining whether a second timer used for restricting sending of a higher power consumption preference indication expires, and if a determination result is yes, sending a higher power consumption preference indication to the base station. The present invention may improve user experience.

3 Claims, 9 Drawing Sheets

Related U.S. Application Data continuation of application No. PCT/CN2013/073760, filed on Apr. 3, 2013.

(51) Int. Cl.
  *H04W 72/04* (2009.01)
  *H04W 76/27* (2018.01)
  *H04W 88/06* (2009.01)

(52) U.S. Cl.
  CPC ....... *H04W 72/0413* (2013.01); *H04W 76/27* (2018.02); *H04W 88/06* (2013.01); *Y02D 70/00* (2018.01); *Y02D 70/24* (2018.01)

(58) Field of Classification Search
  USPC ........................................ 370/461, 462, 463
  See application file for complete search history.

(56) References Cited

U.S. PATENT DOCUMENTS

| | | |
|---|---|---|
| 2011/0182193 A1 | 7/2011 | Dwyer et al. |
| 2011/0269463 A1 | 11/2011 | Wang et al. |
| 2011/0305215 A1 | 12/2011 | Hofmann et al. |
| 2013/0070709 A1 | 3/2013 | Wang et al. |

FOREIGN PATENT DOCUMENTS

| | | |
|---|---|---|
| CN | 102378342 A | 3/2012 |
| CN | 102448158 A | 5/2012 |
| CN | 102547947 A | 7/2012 |
| EP | 2356878 A2 | 8/2011 |
| JP | 2011510557 A | 3/2011 |
| JP | 2013511872 A | 4/2013 |
| JP | 2013527703 A | 6/2013 |
| WO | 2009091303 A1 | 7/2009 |
| WO | 2010054391 A2 | 5/2010 |
| WO | 2011060997 A1 | 5/2011 |
| WO | 2011060998 A1 | 5/2011 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.0.0, pp. 1-302, 3rd Generation Partnership Project, Valbonne, France (Jun. 2012).

"Stage 2 CR on eDDA UE assistance information," 3GPP TSG-RAN WG2 Meeting #78, Prague, Czech Republic, R2-123109, 3rd Generation Partnership Project, Valbonne, France (May 21-25, 2012).

"Summary of email discussion [77bis#25] LTE/EDDA: Assistance information," 3GPP TSG-RAN WG2 Meeting #78, Prague, Czech Republic, R2-122512, 3rd Generation Partnership Project, Valbonne, France (May 21-25, 2012).

"Summary of email discussion [78#43] LTE/EDDA;Power preference indication", 3GPP TSG-RAN WG2 Meeting #79, Qingdao, P.R.C. R2-12XXXX, 3rd Generation Partnership Project, Valbonne, France (Aug. 13-17, 2012).

"TP to 36.331 on MAC Reset and MAC Re-configuration Option 2",3GPP TSG-RAN WG2 #64, Prague, Czech Republic, R2-086342, 3rd Generation Partnership Project, Valbonne. France (Nov. 10-14, 2008).

METHOD AND RELATED EQUIPMENT FOR SENDING SIGNALING

CROSS-REFERENCE TO RELATED APPLICATION

This application is a continuation of U.S. patent application Ser. No. 14/616,346 filed on Feb. 6, 2015, which is a continuation of International Patent Application No. PCT/CN2013/073760, filed on Apr. 3, 2013, which claims priority to International Patent Application No. PCT/CN2012/079743, filed on Aug. 6, 2012. All of the afore-mentioned patent applications are hereby incorporated by reference in their entireties.

THE CHNICAL FIELD

The present invention relates to the field of communications, and in particular, to a method and related equipment for sending signaling.

BACKGROUND

In a discussion about standards of a 3GPP (3rd Generation Partnership Project) EDDA (enhancement on diverse data applications) WI (work item), it is agreed that a UE (user equipment) may send an indication about a UE power consumption preference (power preference indication) to an eNB (evolved NodeB). For example, when a screen of the UE is closed, the UE wishes to work in a more power-saving state, and therefore may request to acquire a more power-saving configuration from the eNB; when the UE wishes to recover to a default state, that is, a state that may ensure QoS (quality of service) requirements of the UE, the UE may request to return to the default state of the UE, and acquire configuration parameters that ensure QoS requirements, from the eNB.

In addition, the power consumption preference indication may be further defined as an indication for requesting "higher/lower" power consumption. For example, when the UE is not satisfied with a current DRX (discontinuous reception) configuration, the UE may request a configuration of lower power consumption, that is, send an indication whose value is "lower" to the eNB; and conversely, if the UE wishes to have better user experience and does not care about power consumption, the UE may send an indication whose value is "higher" to the eNB. The "higher" or "lower" is a relative concept, that is, the UE may continuously request "higher" power consumption or continuously request "lower" power consumption.

To restrict frequent sending of the power consumption preference indication, which may otherwise cause an unnecessary signaling overhead and increase power consumption of the UE, the prior art provides some restriction mechanisms, one of which is a timer-based restriction mechanism. The mechanism includes: after the UE sends a power consumption preference indication (indication for requesting "higher/lower" power consumption), starting a preset timer, and sending the power consumption preference indication again only when the timer expires.

The UE power consumption preference indication may be a request for power optimization (that is, extending a DRX cycle and reducing power consumption), and may also be a request for improving performance (that is, shortening a DRX cycle, and improving performance by sacrificing power consumption, increasing power consumption). As may be seen from the two requests, the request for improving performance of the UE is more urgent than the request for power optimization. Otherwise, if the request for improving performance cannot be satisfied quickly, user experience may deteriorate.

SUMMARY

In view of this, the present invention provides a method and related equipment for sending signaling to differentially process a lower power consumption preference indication and a higher power consumption preference indication and improve user experience.

In a first aspect, the present invention provides a method for sending signaling, where the method may include:

when a power consumption preference of a user equipment is changed to lower power consumption, determining whether a first timer used for restricting sending of a lower power consumption preference indication expires, and if a determination result is yes, sending a lower power consumption preference indication to a base station; and when the power consumption preference of the user equipment is changed to higher power consumption, sending a higher power consumption preference indication to the base station.

In a fifth aspect, the present invention provides a system for controlling signaling sending, where the system may include any one of the foregoing user equipments and the base stations according to the present invention, where the base station is configured to receive a power consumption preference indication sent by the user equipment, and perform a radio resource parameter configuration for the user equipment in a radio resource management process, where the power consumption preference indication includes a lower power consumption preference indication or a higher power consumption preference indication.

In a seventh aspect, the present invention provides a computer storage medium, where the computer storage medium may store a program, and when the program is executed, the program may include all or a part of steps of the method for determining a power consumption preference according to the present invention.

In an eighth aspect, the present invention provides a user equipment, including an input apparatus, an output apparatus, and a processor, where the processor performs the following steps:

when a power consumption preference of the user equipment is changed to lower power consumption, determining whether a first timer used for restricting sending of a lower power consumption preference indication expires, and if a determination result is yes, instructing the output apparatus to send a lower power consumption preference indication to a base station; and when the power consumption preference of the user equipment is changed to higher power consumption, instructing the output apparatus to send a higher power consumption preference indication to the base station.

As may be seen above, in some feasible implementation manners of the present invention, sending of a lower power consumption preference indication and sending of a higher power consumption preference indication by a user equipment are separately restricted, which is more flexible and achieves better user experience than the prior art in which restriction is performed by using a same timer.

DESCRIPTION OF EMBODIMENTS

In some feasible implementation manners of the present invention, when a power consumption preference of a user equipment is changed to lower power consumption, it is determined whether a first timer used for restricting sending of a lower power consumption preference indication expires, and if a determination result is yes, a lower power consumption preference indication is sent to a base station; and when the power consumption preference of the user equipment is changed to higher power consumption, a higher power consumption preference indication is sent to the base station, or when the power consumption preference of the user equipment is changed to higher power consumption, it is determined whether a second timer used for restricting sending of a higher power consumption preference indication expires, and if a determination result is yes, a higher power consumption preference indication is sent to the base station. Thereby, sending of a lower power consumption preference indication and sending of a higher power consumption preference indication by a user equipment are separately restricted, which is more flexible and achieves better user experience than the prior art in which restriction is performed by using a same timer.

The embodiments of the present invention are hereinafter described in detail with reference to the accompanying drawings.

Figure 1:
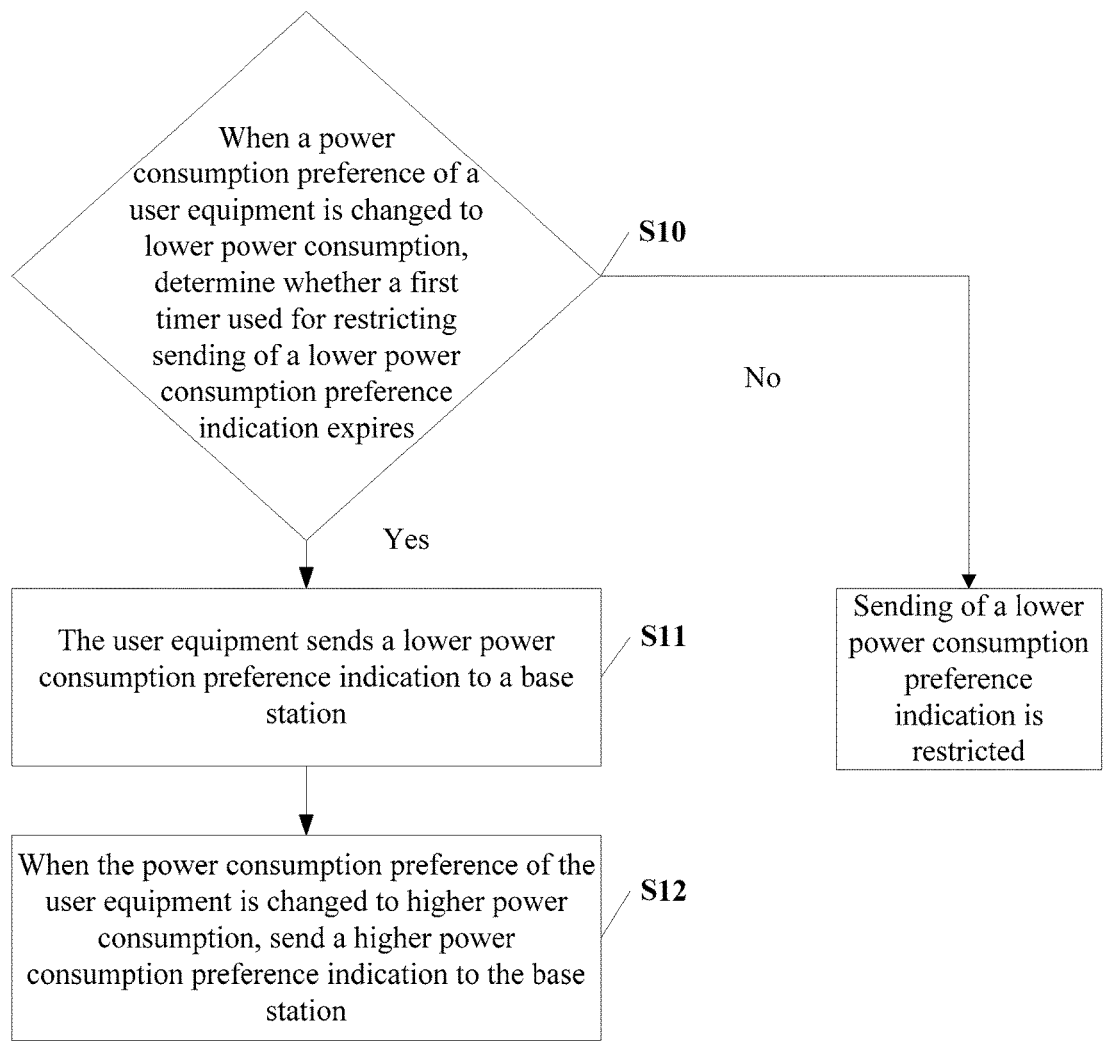
FIG. 1 is a schematic flowchart of a first embodiment of a method for sending signaling according to the present invention.

FIG. 1 is a schematic flowchart of a first embodiment of a method for sending signaling according to the present invention. As shown in FIG. 1, the method may include:

Step S10: When a power consumption preference of a user equipment is changed to lower power consumption, determine whether a first timer used for restricting sending of a lower power consumption preference indication expires, and if a determination result is yes, perform step S11.

Step S11: The user equipment sends a lower power consumption preference indication to a base station.

Step S12: When the power consumption preference of the user equipment is changed to higher power consumption, send a higher power consumption preference indication to the base station.

In some feasible implementation manners, step S10 and step S12 may be performed in any sequence, that is, the power consumption preference of the user equipment is first changed to higher power consumption and then changed to lower power consumption.

In some feasible implementation manners, before step S10, the method may further include a process of determining whether the power consumption preference of the user equipment is changed to lower power consumption, where the process may include:

acquiring, by the user equipment, a fourth timer; therefore, when the fourth timer of the user equipment expires or the user equipment estimates that a duration of an idle state of the user equipment is longer than or equal to a length of the fourth timer of the user equipment, determining that the power consumption preference of the user equipment is changed to lower power consumption; and in some feasible implementation manners, before step S12, the method may further include a process of determining whether the power consumption preference of the user equipment is changed to higher power consumption, where the process may include:

acquiring, by the user equipment, a fifth timer; therefore, when the fifth timer of the user equipment expires or the user equipment estimates that a duration of an idle state of the user equipment is shorter than or equal to a length of the fifth timer of the user equipment, determining that the power consumption preference of the user equipment is changed to higher power consumption.

In some feasible implementation manners, the user equipment may acquire the fourth timer from the base station, and the user equipment may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to a length of a sixth timer in the base station, and the length of the fifth timer is shorter than or equal to a length of a seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the fourth timer acquired by the user equipment expires, it is determined that the power consumption preference of the user equipment is changed to lower power consumption, and when the fifth timer acquired by the user equipment expires, it is determined that the power consumption preference of the user equipment is changed to higher power consumption.

In some feasible implementation manners, the user equipment may acquire the sixth timer from the base station, and the user equipment may acquire the seventh timer from the base station, where the sixth timer or the seventh timer or both may be acquired from at least one of a radio resource control protocol message, a physical layer message, a data link layer message, and a cell handover message sent by the base station. In specific implementation, when the user equipment acquires the length of the sixth timer and the length of the seventh timer from the base station, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment itself may estimate the length of the sixth timer or the seventh timer or both according to a message acquired from the base station. For example, the UE starts a timer after performing a data sending/receiving operation, and the timer is restarted after the UE performs a next data sending/receiving operation. Assuming that the base station delivers a reconfiguration message or an RRC connection release message to the user equipment, the user equipment may decide, according to content of the reconfiguration message or RRC connection release message, whether to record the length of the timer as the length of the sixth timer and the length of the seventh timer. For example, if the reconfiguration message or RRC connection release message is a handover command, or is used for setting up a new radio bearer, or releasing an original radio bearer, and so on, the user equipment does not record the length of the timer as the length of the sixth timer and the length of the seventh timer; if the reconfiguration message or RRC connection release message is used for configuring DRX or configuring more power-saving DRX, the user equipment records the length of the timer as the length of the sixth timer and the length of the seventh timer.

In specific implementation, when the user equipment records the length of the sixth timer and the length of the seventh timer, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the foregoing process of determining that the power consumption preference of the user equipment is changed to lower power consumption, or determining that the power consumption preference of the user equipment is changed to higher power consumption, or both in the embodiment of the present invention may be independent of the process shown in FIG. 1.

In some feasible implementation manners, optionally, when the determination result of determining whether the first timer expires in step S10 is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the corresponding first timer expires, the AS of the user equipment may further notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible implementation manners, a length of the first timer is preset in the user equipment.

In some feasible implementation manners, the length of the first timer is specified by the base station for the user equipment in a radio resource management connection setup process or a radio resource management connection reconfiguration process.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

As may be seen above, in some feasible implementation manners of the present invention, a first timer is used to restrict sending of a lower power consumption preference indication by a user equipment, but sending of a higher power consumption preference indication is not restricted, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 2:
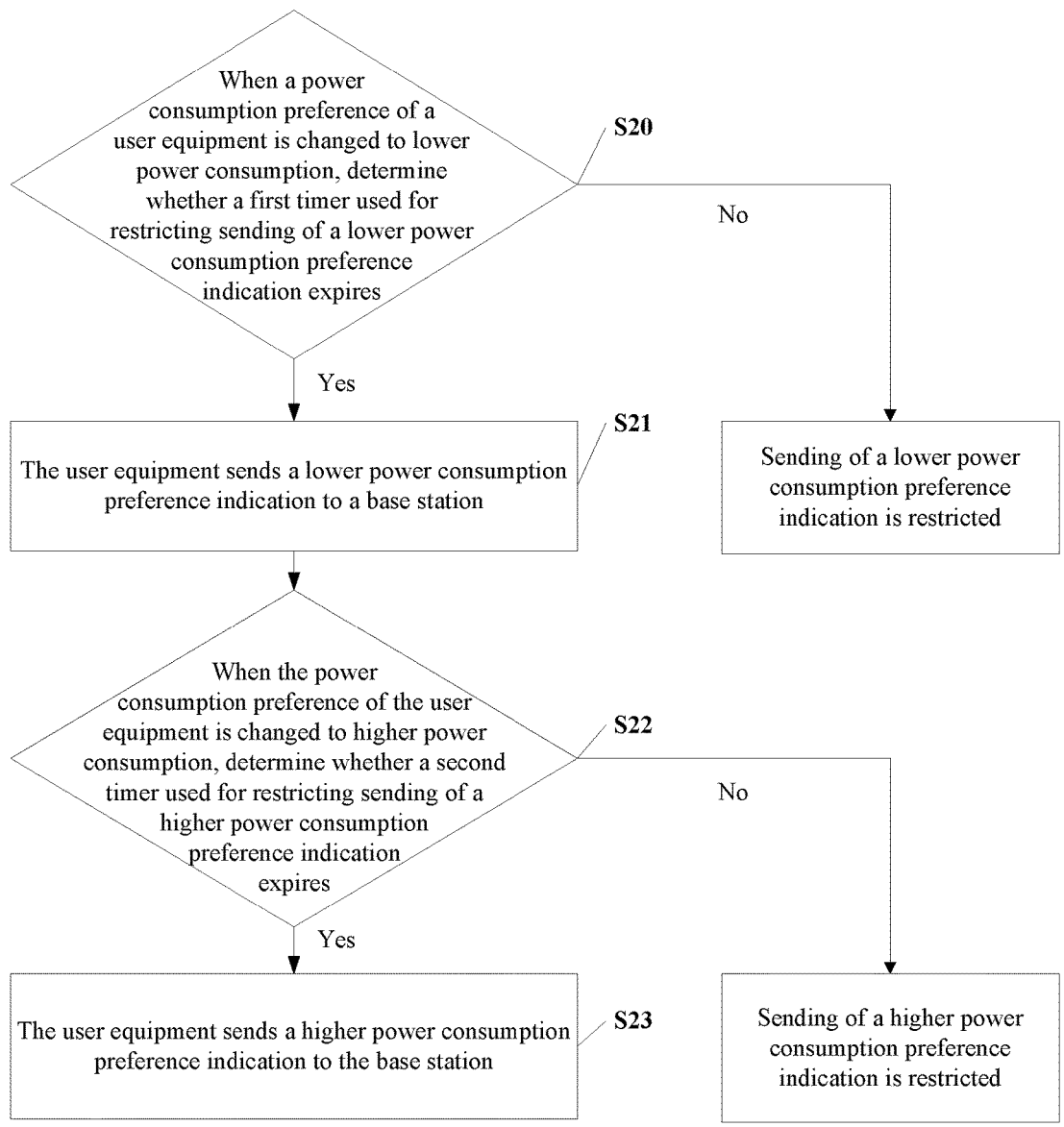
FIG. 2 is a schematic flowchart of a second embodiment of a method for sending signaling according to the present invention.

FIG. 2 is a schematic flowchart of a second embodiment of a method for sending signaling according to the present invention. The second embodiment is an extension of the first embodiment, and as shown in FIG. 2, the second embodiment may include:

Step S20: When a power consumption preference of a user equipment is changed to lower power consumption, determine whether a first timer used for restricting sending of a lower power consumption preference indication expires, and if a determination result is yes, perform step S21.

Step S21: The user equipment sends a lower power consumption preference indication to a base station.

Step S22: When the power consumption preference of the user equipment is changed to higher power consumption, determine whether a second timer used for restricting sending of a higher power consumption preference indication expires, and if a determination result is yes, perform step S23.

Step S23: The user equipment sends a higher power consumption preference indication to the base station.

In some feasible implementation manners, step S20 and step S22 may be performed in any sequence, that is, the power consumption preference of the user equipment is first changed to higher power consumption and then changed to lower power consumption.

In some feasible implementation manners, before step S20, the method may further include a process of determining whether the power consumption preference of the user equipment is changed to lower power consumption, where the process may include:

acquiring, by the user equipment, a fourth timer; therefore, when the fourth timer of the user equipment expires or the user equipment estimates that a duration of an idle state of the user equipment is longer than or equal to a length of the fourth timer of the user equipment, determining that the power consumption preference of the user equipment is changed to lower power consumption; and in some feasible implementation manners, before step S22, the method may further include a process of determining whether the power consumption preference of the user equipment is changed to higher power consumption, where the process may include:

acquiring, by the user equipment, a fifth timer; therefore, when the fifth timer of the user equipment expires or the user equipment estimates that a duration of an idle state of the user equipment is shorter than or equal to a length of the fifth timer of the user equipment, determining that the power consumption preference of the user equipment is changed to higher power consumption.

In some feasible implementation manners, the user equipment may acquire the fourth timer from the base station, and the user equipment may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to a length of a sixth timer in the base station, and the length of the fifth timer is shorter than or equal to a length of a seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the fourth timer acquired by the user equipment expires, it is determined that the power consumption preference of the user equipment is changed to lower power consumption, and when the fifth timer acquired by the user equipment expires, it is determined that the power consumption preference of the user equipment is changed to higher power consumption.

In some feasible implementation manners, the user equipment may acquire the sixth timer from the base station, and the user equipment may acquire the seventh timer from the base station, where the sixth timer or the seventh timer or both may be acquired from at least one of a radio resource control protocol message, a physical layer message, a data link layer message, and a cell handover message sent by the base station. In specific implementation, when the user equipment acquires the length of the sixth timer and the length of the seventh timer from the base station, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment itself may estimate the length of the sixth timer or the seventh timer or both according to a message acquired from the base station. For example, the UE starts a timer after performing a data sending/receiving operation, and the timer is restarted after the UE performs a next data sending/receiving operation. Assuming that the base station delivers a reconfiguration message or an RRC connection release message to the user equipment, the user equipment may decide, according to content of the reconfiguration message or RRC connection release message, whether to record the length of the timer as the length of the sixth timer and the length of the seventh timer. For example, if the reconfiguration message or RRC connection release message is a handover command, or is used for setting up a new radio bearer, or releasing an original radio bearer, and so on, the user equipment does not record the length of the timer as the length of the sixth timer and the length of the seventh timer; if the reconfiguration message or RRC connection release message is used for configuring DRX or configuring more power-saving DRX, the user equipment records the length of the timer as the length of the sixth timer and the length of the seventh timer.

In specific implementation, when the user equipment records the length of the sixth timer and the length of the seventh timer, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the foregoing process of determining that the power consumption preference of the user equipment is changed to lower power consumption, or determining that the power consumption preference of the user equipment is changed to higher power consumption, or both in the embodiment of the present invention may be independent of the process shown in FIG. 2.

In some feasible implementation manners, optionally, when the determination result of determining whether the first timer expires in step S20 is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the corresponding first timer expires, the AS of the user equipment may further notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible embodiments, optionally, when the determination result of determining whether the second timer expires in step S22 is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the second timer expires, the AS of the user equipment may further notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible implementation manners, lengths of the first timer and the second timer may be preset in the user equipment.

In some feasible implementation manners, the length of the first timer and the length of the second timer may be specified by the base station for the user equipment in a radio resource management connection setup process or a radio resource management connection reconfiguration process.

In some feasible implementation manners, the length of the first timer is longer than or equal to the length of the second timer.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 3:
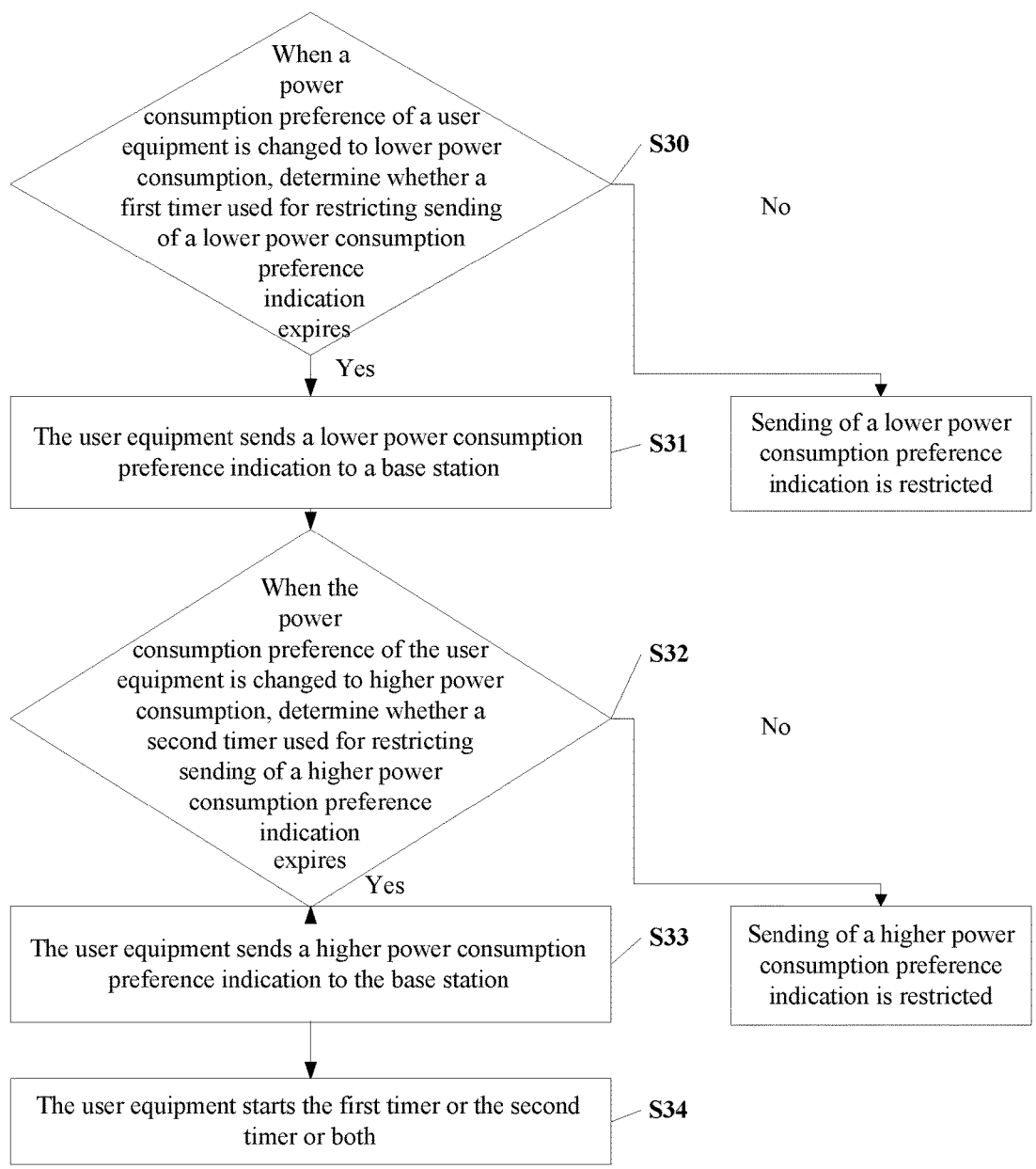
FIG. 3 is a schematic flowchart of a third embodiment of a method for sending signaling according to the present invention.

FIG. 3 is a schematic flowchart of a third embodiment of a method for sending signaling according to the present invention. The embodiment is an extension based on the second embodiment. As shown in FIG. 3, the embodiment may include:

Step S30: When a power consumption preference of a user equipment is changed to lower power consumption, determine whether a first timer used for restricting sending of a lower power consumption preference indication expires, and if a determination result is yes, perform step S31.

Step S31: The user equipment sends a lower power consumption preference indication to a base station.

Step S32: When the power consumption preference of the user equipment is changed to higher power consumption, determine whether a second timer used for restricting sending of a higher power consumption preference indication expires, and if a determination result is yes, perform step S33.

Step S33: The user equipment sends a higher power consumption preference indication to the base station.

Step S34: The user equipment starts the first timer or the second timer or both.

In some feasible implementation manners, step S30 and step S32 may be performed in any sequence, that is, the power consumption preference of the user equipment is first changed to higher power consumption and then changed to lower power consumption. The sequence between step 34 and step 30, step 31, step 32, and step 33 is: step 30, step 31, step 34; or step 32, step 33, step 34. That is, every time after the user equipment sends a power consumption preference indication to the base station, step 34 needs to be performed no matter whether the sent power consumption preference indication is a lower or higher power consumption preference indication.

In some feasible implementation manners, before step S30, the method may further include a process of determining whether the power consumption preference of the user equipment is changed to lower power consumption, where the process may include:

acquiring, by the user equipment, a fourth timer; therefore, when the fourth timer of the user equipment expires or the user equipment estimates that a duration of an idle state of the user equipment is longer than or equal to a length of the fourth timer of the user equipment, determining that the power consumption preference of the user equipment is changed to lower power consumption; and in some feasible implementation manners, before step S32, the method may further include a process of determining whether the power consumption preference of the user equipment is changed to higher power consumption, where the process may include:

acquiring, by the user equipment, a fifth timer; therefore, when the fifth timer of the user equipment expires or the user equipment estimates that a duration of an idle state of the user equipment is shorter than or equal to a length of the fifth timer of the user equipment, determining that the power consumption preference of the user equipment is changed to higher power consumption.

In some feasible implementation manners, the user equipment may acquire the fourth timer from the base station, and the user equipment may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to a length of a sixth timer in the base station, and the length of the fifth timer is shorter than or equal to a length of a seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the fourth timer acquired by the user equipment expires, it is determined that the power consumption preference of the user equipment is changed to lower power consumption, and when the fifth timer acquired by the user equipment expires, it is determined that the power consumption preference of the user equipment is changed to higher power consumption.

In some feasible implementation manners, the user equipment may acquire the sixth timer from the base station, and the user equipment may acquire the seventh timer from the base station, where the sixth timer or the seventh timer or both may be acquired from at least one of a radio resource control protocol message, a physical layer message, a data link layer message, and a cell handover message sent by the base station. In specific implementation, when the user equipment acquires the length of the sixth timer and the length of the seventh timer from the base station, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment itself may estimate the length of the sixth timer or the seventh timer or both according to a message acquired from the base station. For example, the UE starts a timer after performing a data sending/receiving operation, and the timer is restarted after the UE performs a next data sending/receiving operation. Assuming that the base station delivers a reconfiguration message or an RRC connection release message to the user equipment, the user equipment may decide, according to content of the reconfiguration message or RRC connection release message, whether to record the length of the timer as the length of the sixth timer and the length of the seventh timer. For example, if the reconfiguration message or RRC connection release message is a handover command, or is used for setting up a new radio bearer, or releasing an original radio bearer, and so on, the user equipment does not record the length of the timer as the length of the sixth timer and the length of the seventh timer; if the reconfiguration message or RRC connection release message is used for configuring DRX or configuring more power-saving DRX, the user equipment records the length of the timer as the length of the sixth timer and the length of the seventh timer.

In specific implementation, when the user equipment records the length of the sixth timer and the length of the seventh timer, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the foregoing process of determining that the power consumption preference of the user equipment is changed to lower power consumption, or determining that the power consumption preference of the user equipment is changed to higher power consumption, or both in the embodiment of the present invention may be independent of the process shown in FIG. 3.

In some feasible implementation manners, optionally, when the determination result of determining whether the first timer expires in step S30 is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the corresponding first timer expires, the AS of the user equipment may further notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible embodiments, optionally, when the determination result of determining whether the second timer expires in step S32 is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the second timer expires, the AS of the user equipment may further notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible implementation manners, lengths of the first timer and the second timer may be preset in the user equipment.

In some feasible implementation manners, the length of the first timer and the length of the second timer may be specified by the base station for the user equipment in a radio resource management connection setup process or a radio resource management connection reconfiguration process.

In some feasible implementation manners, the length of the first timer is longer than or equal to the length of the second timer.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

In some feasible implementation manners, the step "when the power consumption preference of the user equipment is changed to higher power consumption, send a higher power consumption preference indication to the base station" may be used to replace step S32 and step S33. In this case, step S34 may be replaced with: "The user equipment starts the first timer."

In some feasible embodiments, when the user equipment has two definite states, in step S34, when the user equipment is in the default state, only the first timer may be started; when the user equipment is in the lower power consumption state, only the second timer may be started. If the user equipment includes only the first timer, the timer does not need to be started when it is determined that the user is in the lower power consumption state in step S34. If the user equipment is not restricted by the state, the first timer and the second timer may be started simultaneously in step S34; if the user equipment includes only the first timer, only the first timer is started in step S34. When the user equipment starts the two timers simultaneously, if the user equipment requests to send a new power consumption preference and the sending is successful because a sending condition is satisfied, if one of the two timers is still running, the first timer and the second timer need to be started simultaneously after the timer is stopped. In this embodiment and subsequent embodiments, "starting" in the present invention includes starting for the first time and restarting after the timer is cleared to zero subsequently.

In some feasible implementation manners, optionally, after step S34 is performed, when the first timer in the user equipment expires, but no radio resource parameter configuration result sent by the base station is received, and when the power consumption preference of the user equipment is changed to lower power consumption again, the user equipment is unable to send a lower power consumption preference indication to the base station, until a radio resource parameter configuration result sent by the base station is received.

In some feasible implementation manners, optionally, after step S34 is performed, when the second timer in the user equipment expires, but no radio resource parameter configuration result sent by the base station is received, and the power consumption preference of the user equipment is changed to higher power consumption again, the user equipment is unable to send a higher power consumption preference indication to the base station, until a radio resource parameter configuration result sent by the base station is received.

In some feasible implementation manners, optionally, after step S34 is performed, when the first timer in the user equipment does not expire, and a radio resource parameter configuration result sent by the base station is received, and when the power consumption preference of the user equipment is changed to lower power consumption again, the user equipment is unable to send a lower power consumption preference indication to the base station, until the first timer expires.

In some feasible implementation manners, optionally, after step S34 is performed, when the second timer in the user equipment does not expire, and a radio resource parameter configuration result sent by the base station is received, and when the power consumption preference of the user equipment is changed to higher power consumption again, the user equipment is unable to send a higher power consumption preference indication to the base station, until the second timer expires.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 4:
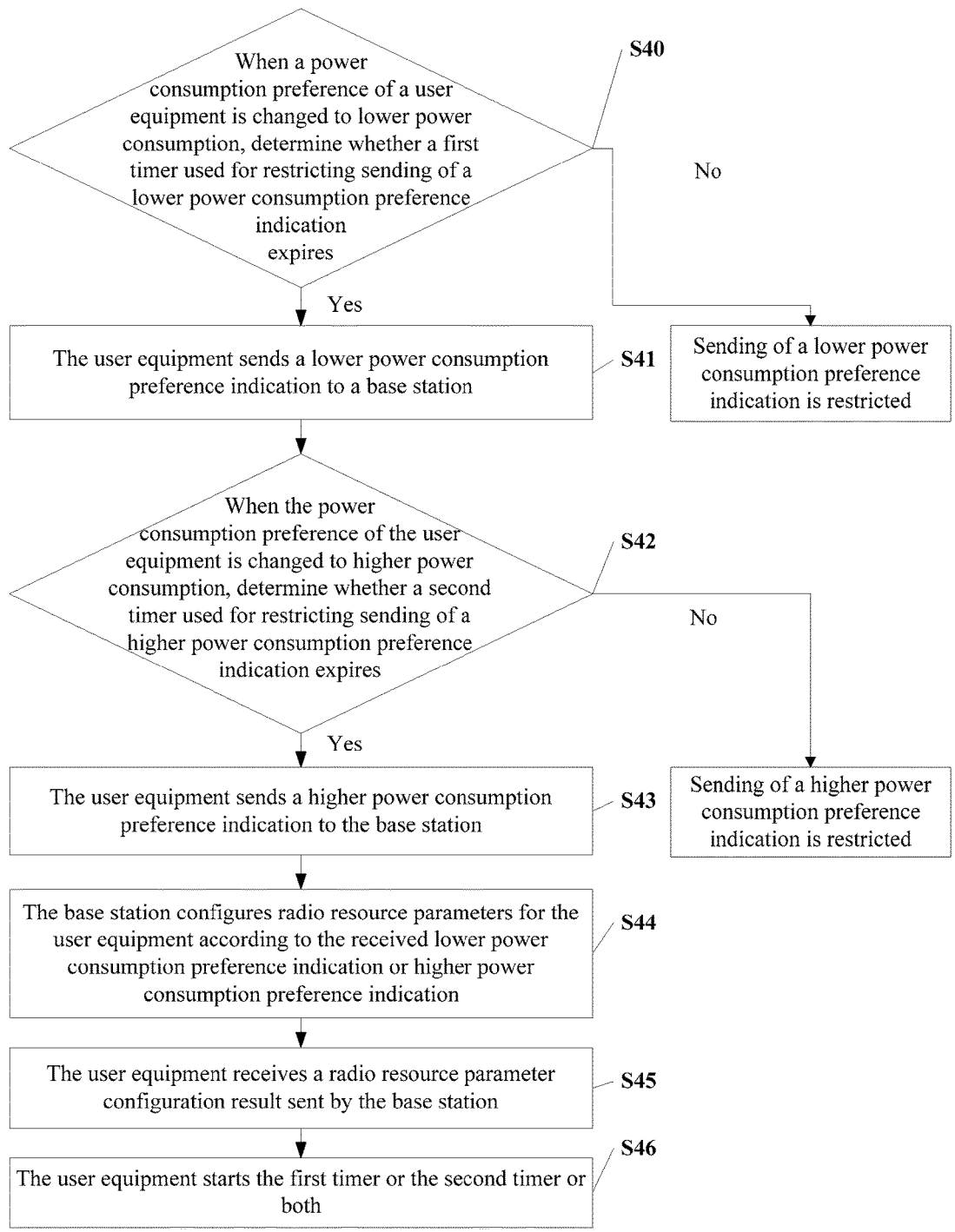
FIG. 4 is a schematic flowchart of a fourth embodiment of a method for sending signaling according to the present invention.

FIG. 4 is a schematic flowchart of a fourth embodiment of a method for sending signaling according to the present invention. The embodiment is an extension based on the second embodiment. As shown in FIG. 4, the embodiment may include:

Step S40: When a power consumption preference of a user equipment is changed to lower power consumption, determine whether a first timer used for restricting sending of a lower power consumption preference indication expires, and if a determination result is yes, perform step S41.

Step S41: The user equipment sends a lower power consumption preference indication to a base station.

Step S42: When the power consumption preference of the user equipment is changed to higher power consumption, determine whether a second timer used for restricting sending of a higher power consumption preference indication expires, and if a determination result is yes, perform step S43.

Step S43: The user equipment sends a higher power consumption preference indication to the base station.

Step S44: The base station configures radio resource parameters for the user equipment according to the received lower power consumption preference indication or higher power consumption preference indication.

Step S45: The user equipment receives a radio resource parameter configuration result sent by the base station.

Step S46: The user equipment starts the first timer or the second timer or both.

In some feasible implementation manners, step S40 and step S42 may be performed in any sequence, that is, the power consumption preference of the user equipment is first changed to higher power consumption and then changed to lower power consumption. The sequence between steps 44 to step 46 and step 40, step 41, step 42, and step 43 is: step 40, step 41, step 44 to step 46; or step 42, step 43, step 44 to step 46. That is, every time after the user equipment receives a radio resource parameter configuration result sent by the base station, step 44 to step 46 need to be performed no matter whether the sent power consumption preference indication is a lower or higher power consumption preference indication.

In some feasible implementation manners, before step S40, the method may further include a process of determining whether the power consumption preference of the user equipment is changed to lower power consumption, where the process may include:

acquiring, by the user equipment, a fourth timer; therefore, when the fourth timer of the user equipment expires or the user equipment estimates that a duration of an idle state of the user equipment is longer than or equal to a length of the fourth timer of the user equipment, determining that the power consumption preference of the user equipment is changed to lower power consumption; and in some feasible implementation manners, before step S42, the method may further include a process of determining whether the power consumption preference of the user equipment is changed to higher power consumption, where the process may include:

acquiring, by the user equipment, a fifth timer; therefore, when the fifth timer of the user equipment expires or the user equipment estimates that a duration of an idle state of the user equipment is shorter than or equal to a length of the fifth timer of the user equipment, determining that the power consumption preference of the user equipment is changed to higher power consumption.

In some feasible implementation manners, the user equipment may acquire the fourth timer from the base station, and the user equipment may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to a length of a sixth timer in the base station, and the length of the fifth timer is shorter than or equal to a length of a seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the fourth timer acquired by the user equipment expires, it is determined that the power consumption preference of the user equipment is changed to lower power consumption, and when the fifth timer acquired by the user equipment expires, it is determined that the power consumption preference of the user equipment is changed to higher power consumption.

In some feasible implementation manners, the user equipment may acquire the sixth timer from the base station, and the user equipment may acquire the seventh timer from the base station, where the sixth timer or the seventh timer or both may be acquired from at least one of a radio resource control protocol message, a physical layer message, a data link layer message, and a cell handover message sent by the base station. In specific implementation, when the user equipment acquires the length of the sixth timer and the length of the seventh timer from the base station, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment itself may estimate the length of the sixth timer or the seventh timer or both according to a message acquired from the base station. For example, the UE starts a timer after performing a data sending/receiving operation, and the timer is restarted after the UE performs a next data sending/receiving operation. Assuming that the base station delivers a reconfiguration message or an RRC connection release message to the user equipment, the user equipment may decide, according to content of the reconfiguration message or RRC connection release message, whether to record the length of the timer as the length of the sixth timer and the length of the seventh timer. For example, if the reconfiguration message or RRC connection release message is a handover command, or is used for setting up a new radio bearer, or releasing an original radio bearer, and so on, the user equipment does not record the length of the timer as the length of the sixth timer and the length of the seventh timer; if the reconfiguration message or RRC connection release message is used for configuring DRX or configuring more power-saving DRX, the user equipment records the length of the timer as the length of the sixth timer and the length of the seventh timer.

In specific implementation, when the user equipment records the length of the sixth timer and the length of the seventh timer, the fourth timer may be set in the user equipment according to the sixth timer, and the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the fourth timer set in the user equipment expires, it is determined that the power consumption preference of the user equipment is changed to lower power consumption, and when the fifth timer set by the user equipment expires, it is determined that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the foregoing process of determining that the power consumption preference of the user equipment is changed to lower power consumption, or determining that the power consumption preference of the user equipment is changed to higher power consumption, or both in the embodiment of the present invention may be independent of the process shown in FIG. 4.

In some feasible implementation manners, optionally, when the determination result of determining whether the first timer expires in step S40 is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the corresponding first timer expires, the AS of the user equipment may further notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible embodiments, optionally, when the determination result of determining whether the second timer expires in step S42 is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the AS of the user equipment may notify the upper layer that sending of a "power preference indication" is restricted; and after the second timer expires, the AS of the user equipment may further notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible implementation manners, in step S44, after the base station receives a lower power consumption preference indication, the base station configures DRX parameters corresponding to the lower power consumption ("lower power consumption") state and physical layer parameters (such as CQI, Sounding) for the user equipment, where a practice may be as follows:

During an RRC connection reconfiguration, the base station configures two sets of discontinuous reception DRX parameters for the user equipment, and instructs the user equipment to use, when the user equipment performs a radio resource management connection, the DRX parameters corresponding to "lower power consumption"; and the base station configures two sets of physical layer parameters for the user equipment according to the two sets of discontinuous reception DRX parameters, and instructs the user equipment to use, when the user equipment performs a radio resource management connection, physical layer parameters corresponding to the DRX parameters corresponding to "lower power consumption".

In some feasible implementation manners, in step S44, after the base station receives a higher power consumption preference indication, the base station configures DRX parameters corresponding to the higher power consumption ("default") state and physical layer parameters (such as CQI, Sounding) for the user equipment, where a practice may be as follows:

During an RRC connection reconfiguration, the base station configures two sets of discontinuous reception DRX parameters for the user equipment, and instructs the user equipment to use, when the user equipment performs a radio resource management connection, the DRX parameters corresponding to "default"; and the base station configures two sets of physical layer parameters for the user equipment according to the two sets of discontinuous reception DRX parameters, and instructs the user equipment to use, when the user equipment performs a radio resource management connection, physical layer parameters corresponding to the DRX parameters corresponding to "default".

In some feasible implementation manners, the setting, by the base station, the DRX parameters include setting the length of the DRX cycle. After receiving a lower power consumption preference indication, the base station may set the length of the DRX cycle to be shorter than the length of the DRX cycle in the IDLE state. After receiving a higher power consumption preference indication, the base station may set the length of the DRX cycle to be longer than or equal to the length of the DRX cycle in the IDLE state.

In some feasible embodiments, the user equipment may also implicitly determine the used DRX parameters by determining the current state of the user equipment: When the user equipment is currently in the "default" state, if the base station does not definitely instruct the user equipment to change the state, the user equipment uses new DRX parameters corresponding to the "default" state; otherwise, when the user equipment is currently in the "lower power consumption" state, if the base station does not definitely instruct the user equipment to change the state, the user equipment uses new DRX parameters corresponding to the "lower power consumption" state.

In some feasible implementation manners, lengths of the first timer and the second timer may be preset in the user equipment.

In some feasible implementation manners, the length of the first timer and the length of the second timer may be specified by the base station for the user equipment in a radio resource management connection setup process or a radio resource management connection reconfiguration process.

In some feasible implementation manners, the length of the first timer is longer than or equal to the length of the second timer.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

In some feasible implementation manners, the step "when the power consumption preference of the user equipment is changed to higher power consumption, send a higher power consumption preference indication to the base station" may be used to replace step S42 and step S43. In this case, step S46 may be replaced with: "The user equipment starts the first timer."

In some feasible embodiments, when the user equipment has two definite states, in step S46, when the user equipment is in the default state, only the first timer may be started; when the user equipment is in the lower power consumption state, only the second timer may be started. If the user equipment includes only the first timer, the timer does not need to be started when it is determined that the user is in the lower power consumption state in step S46. If the user equipment is not restricted by the state, the first timer and the second timer may be started simultaneously in step S46; if the user equipment includes only the first timer, only the first timer is started in step S46. When the user equipment starts the two timers simultaneously, if the user equipment requests to send a new power consumption preference and the sending is successful because a sending condition is satisfied, if one of the two timers is still running, the first timer and the second timer need to be started simultaneously after the timer is stopped.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

To better implement each solution of the method embodiments of the present invention, the embodiments of the present invention further provide related apparatuses.

Figure 5:
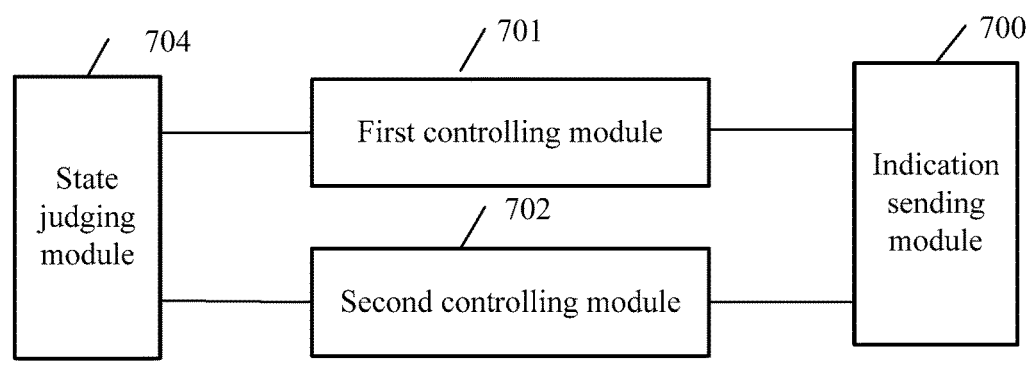
FIG. 5 is a schematic structural diagram of a first embodiment of a user equipment according to the present invention.

FIG. 5 is a schematic structural diagram of a first embodiment of a user equipment that may be used to implement a method embodiment of the present invention. As shown in FIG. 5, the user equipment of the present invention may include an indication sending module 700, a first controlling module 701, and a second controlling module 702.

The indication sending module 700 is configured to send a power consumption preference indication to a base station, where the power consumption preference indication includes a lower power consumption preference indication or a higher power consumption preference indication.

The first controlling module 701 is configured to determine, when a power consumption preference of the user equipment is changed to lower power consumption, whether a first timer used for restricting sending of a lower power consumption preference indication expires, and if a determination result is yes, notify the indication sending module 700 to send a lower power consumption preference indication to the base station.

The second controlling module 702 is configured to notify, when the power consumption preference of the user equipment is changed to higher power consumption, the indication sending module to send a higher power consumption preference indication to the base station.

In some feasible implementation manners, sending of a power consumption preference indication ("power preference indication", including a lower power consumption preference indication and a higher power consumption preference indication) may be performed based on two definite states of the user equipment. In this case, the user equipment has two states, a default state ("default" state) and a lower power consumption state ("lower power consumption" state). When the user equipment determines that the user equipment is in the "default (default)" state, the user equipment can only send a "lower power consumption (lower power consumption)" preference indication to the base station (for example, an evolved NodeB eNB); conversely, if the user determines that the user is in the "lower power consumption" state, the user can only send a preference indication for returning to the "default" state (higher power consumption) to the base station. In this case, optionally, the user equipment of the present invention further includes a state judging module 704, configured to determine the state of the user equipment. The first controlling module 701 determines, when the power consumption preference of the user equipment is changed to lower power consumption, and the state judging module 704 indicates that the user equipment is in the default state, whether the first timer (which may be recorded as "T_Default") used for restricting sending of a lower power consumption preference indication expires (that is, the timer does not run), and if a determination result is yes, notifies the indication sending module 700 to send a lower power consumption preference indication to the base station; and the second controlling module 702 notifies, when the power consumption preference of the user equipment is changed to higher power consumption, and the state judging module 704 indicates that the user equipment is in the lower power consumption state, the indication sending module 700 to send a higher power consumption indication to the base station.

In some feasible implementation manners, a method for determining the state of the user equipment by the state judging module 704 may include:

determining, by the state judging module 704, the state of the user equipment according to a specified parameter length, and when the parameter length meets a length required by the default state, determining that the user equipment is in the default state, or when the parameter length meets a length required by the lower power consumption state, determining that the user equipment is in the lower power consumption state. For example, the state judging module 704 may determine the state of the user equipment by using a length of a discontinuous reception cycle (DRX cycle) in the user equipment; when the length of the DRX cycle currently configured for the user equipment is shorter than a length of a DRX cycle in the idle state, the state judging module 704 determines that the user equipment is in the "default" state; and when the length of the DRX cycle currently configured for the user equipment is longer than or equal to the length of the DRX cycle in the IDLE state, the state judging module 704 considers that the UE is in the "lower power consumption" state. The length of the DRX cycle in the idle state is used above as a threshold to distinguish the "default" and "lower power consumption" states, which is only an example. In specific implementation, lengths of other parameters may be used as thresholds for executing a determination. Thereby, when the state judging module 704 determines that the user equipment is using the length of the DRX cycle corresponding to the "default" state, that is, determines that the user equipment is in the "default" state, if the power preference of the user equipment is changed and the user equipment expects lower power consumption, on a premise that the first timer expires, the indication sending module 700 may send a "power preference indication" to the base station, requesting to use a DRX parameter configuration corresponding to the "lower power consumption" state. When the state judging module 704 determines that the user equipment is using the length of the DRX cycle corresponding to the "lower power consumption" state, that is, the user equipment is in the "lower power consumption" state, if the power preference of the user equipment is changed and the user equipment expects higher performance, namely, higher power consumption, the indication sending module 700 may send a "power preference indication" to the base station, requesting to use a DRX parameter configuration corresponding to the "default" state.

In some feasible implementation manners, the method for determining the state of the user equipment by the state judging module 704 may include:

determining, by the state judging module 704, the state of the user equipment according to discontinuous reception DRX parameters configured by the base station for the user equipment, and when the user equipment is using discontinuous reception DRX parameters corresponding to the default state, determining that the user equipment is in the default state, or when the user equipment is using discontinuous reception DRX parameters corresponding to the lower power consumption state, determining that the user equipment is in the lower power consumption state.

In some feasible implementation manners, the base station may simultaneously configure the discontinuous reception DRX parameters corresponding to the default state and the discontinuous reception DRX parameters corresponding to the lower power consumption state for the user equipment, and explicitly or implicitly notify the user of the states corresponding to the parameters. Alternatively, the base station may also configure only a set of DRX parameters for the user equipment every time, and explicitly indicate a state corresponding to the DRX parameters. For example, the base station may configure two different sets of DRX parameters for the user equipment when setting up a radio resource management RRC connection. In addition, the base station may explicitly indicate which set of DRX parameters is used when the UE enters an RRC connected state (use the DRX parameters corresponding to "default", or use the DRX parameters corresponding to "lower power consumption"), that is, the UE is in which state; or it may be specified by default that the user equipment directly enters the "default" state when entering the RRC connected state, and uses the DRX parameters corresponding to the "default" state; or it may be specified by default that the user equipment directly enters the "lower power consumption" state when entering the RRC connected state, and uses the DRX parameters corresponding to the "lower power consumption" state. For another example, the base station may perform the configuration in an RRC connection reconfiguration process, that is, the base station configures two different sets of DRX parameters for the user equipment in an RRC connection reconfiguration process. Therefore, the base station may indicate which set of DRX parameters is used by the user equipment after the RRC connection reconfiguration process, that is, the user equipment is in which state. For another example, the base station implicitly indicates the state of the user equipment. A practice is that the user equipment determines the state of the user equipment by determining the currently used DRX parameters: if the user equipment finds that one set of the two sets of DRX parameters newly configured by the base station is the same as the DRX parameters currently used by the user equipment, the UE determines the state of the UE after the reconfiguration by using the state corresponding to the set of DRX parameters. Thereby, when the state judging module 704 determines that the user equipment is using the DRX parameters corresponding to the "default" state, that is, the user equipment is in the "default" state, if the power preference of the user equipment is changed and the user equipment expects lower power consumption, on a premise that the first timer expires, the user equipment may send a "power preference indication" to the base station, requesting to use a DRX parameter configuration corresponding to the "lower power consumption" state. When the state judging module 704 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, the user equipment may send a "power preference indication" to the base station, requesting to use a DRX parameter configuration corresponding to the "default" state.

In some feasible implementation manners, sending of a power consumption preference indication ("power preference indication", including a lower power consumption preference indication and a higher power consumption preference indication) may be not restricted by the state of the user equipment, that is, so long as the power consumption preference of the user equipment is changed, a power consumption preference indication may be sent to the base station. In this case, the user equipment may not include the state judging module 704. When the power consumption preference of the user equipment is changed to lower power consumption, the first controlling module 701 directly determines whether the first timer used for restricting sending of a lower power consumption preference indication expires, and if a determination result is yes, notifies the indication sending module 700 to send a lower power consumption preference indication to the base station; and when the power consumption preference of the user equipment is changed to higher power consumption, the second controlling module 702 directly notifies the indication sending module 700 to send a higher power consumption preference indication to the base station.

In some feasible implementation manners, optionally, when the determination result of determining by the first controlling module 701 whether the first timer expires is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the first controlling module 701 is further configured to instruct the AS to notify the upper layer that sending of a "power preference indication" is restricted; and after the corresponding first timer expires, the first controlling module 701 is further configured to instruct the AS to further notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the user equipment may perform no operations.

In some feasible implementation manners, the length of the first timer is preset in the user equipment. In this case, optionally, the user equipment may further include a setting module (not shown in the figure), configured to preset the length of the first timer in the user equipment.

In some feasible implementation manners, the length of the first timer is specified by the base station for the user equipment in a radio resource management connection setup process or a radio resource management connection reconfiguration process. In this case, optionally, the user equipment may further include a length receiving module (not shown in the figure), configured to receive the length of the first timer specified by the base station for the user equipment.

In some feasible implementation manners, the user equipment may further include a timer acquiring module (not shown in the figure), configured to acquire at least one of a fourth timer and a fifth timer; and an indication determining module (not shown in the figure), configured to determine, when the fourth timer acquired by the timer acquiring module expires or the user equipment estimates that a duration of an idle state of the user equipment is longer than or equal to a length of the fourth timer acquired by the timer acquiring module, that the power consumption preference of the user equipment is changed to lower power consumption; and/or determine, when the fifth timer acquired by the timer acquiring module expires or the user equipment estimates that a duration of an idle state of the user equipment is shorter than or equal to a length of the fifth timer acquired by the timer acquiring module, that the power consumption preference of the user equipment is changed to higher power consumption.

In some feasible implementation manners, the timer acquiring module includes at least one of a first acquiring submodule and a second acquiring submodule, where:

the first acquiring submodule is configured to set the fourth timer according to a sixth timer, or acquire the fourth timer from the base station, where the sixth timer is a timer set in the base station; and the second acquiring submodule is configured to set the fifth timer according to a seventh timer, or acquire the fifth timer from the base station, where the seventh timer is a timer set in the base station.

In some feasible implementation manners, the length of the fourth timer is shorter than or equal to a length of the sixth timer, and the first acquiring submodule is further configured to acquire the sixth timer from the base station, or estimate, according to a message acquired from the base station, the length of the sixth timer set in the base station; and the length of the fifth timer is shorter than or equal to a length of the seventh timer, and the second acquiring submodule is further configured to acquire the seventh timer from the base station, or estimate, according to a message acquired from the base station, the length of the seventh timer set in the base station.

In some feasible implementation manners, the first acquiring submodule may acquire the fourth timer from the base station, and the second acquiring submodule may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to the length of the sixth timer in the base station, and the length of the fifth timer is shorter than or equal to the length of the seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the indication determining module knows that the fourth timer acquired by the first acquiring submodule expires, the indication determining module may determine that the power consumption preference of the user equipment is changed to lower power consumption, and when the indication determining module knows that the fifth timer acquired by the second acquiring submodule expires, determine that the power consumption preference of the user equipment is changed to higher power consumption.

In some feasible implementation manners, the first acquiring submodule may acquire the sixth timer from the base station, and the second acquiring submodule may acquire the seventh timer from the base station, where the sixth timer or the seventh timer or both may be acquired from at least one of a radio resource control protocol message, a physical layer message, a data link layer message, and a cell handover message sent by the base station. In specific implementation, when the first acquiring submodule acquires the sixth timer from the base station, the fourth timer may be set in the user equipment according to the sixth timer, and when the second acquiring submodule acquires the seventh timer from the base station, the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment itself may estimate the sixth timer according to a message acquired by the first acquiring submodule from the base station or estimate the length of the seventh timer according to a message acquired by the second acquiring submodule from the base station or estimate both. For example, the UE starts a timer after performing a data sending/receiving operation, and the timer is restarted after the UE performs a next data sending/receiving operation. Assuming that the base station delivers a reconfiguration message or an RRC connection release message to the user equipment, the first acquiring submodule may decide, according to content of the reconfiguration message or RRC connection release message, whether to record the length of the timer as the length of the sixth timer; and the second acquiring submodule may decide, according to content of the reconfiguration message or RRC connection release message, whether to record the length of the timer as the length of the seventh timer. For example, if the reconfiguration message or RRC connection release message is a handover command, or is used for setting up a new radio bearer, or releasing an original radio bearer, and so on, the first acquiring submodule or second acquiring submodule does not record the length of the timer as the length of the sixth timer; if the reconfiguration message or RRC connection release message is used for configuring DRX or configuring more power-saving DRX, the first acquiring submodule records the length of the timer as the length of the sixth timer.

In specific implementation, when recording the length of the sixth timer and the length of the seventh timer, the first acquiring submodule may set the fourth timer in the user equipment according to the sixth timer, and the second acquiring submodule may set the fifth timer according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the user equipment of the embodiment of the present invention may include only a timer acquiring module and an indication determining module, and such a user equipment may be dedicated to determining the power consumption preference of the user equipment.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

As may be seen above, in some feasible implementation manners of the present invention, a first timer is used to restrict sending of a lower power consumption preference indication by a user equipment, but sending of a higher power consumption preference indication is not restricted, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 6:
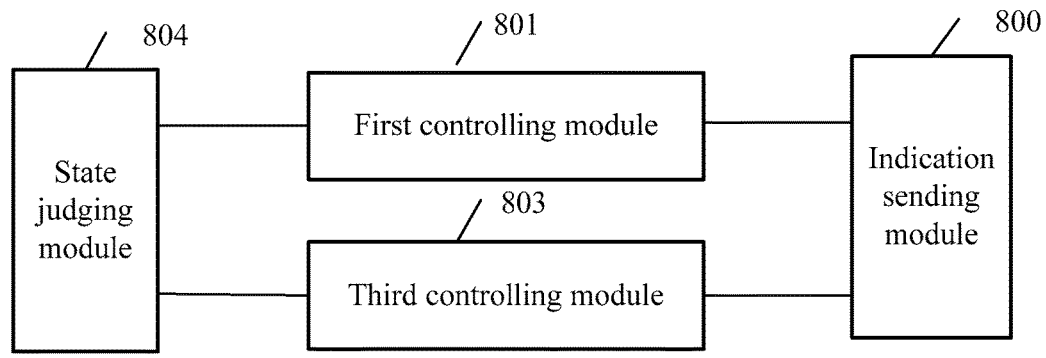
FIG. 6 is a schematic structural diagram of a second embodiment of a user equipment according to the present invention.

FIG. 6 is a schematic structural diagram of a second embodiment of a user equipment according to the present invention. As shown in FIG. 6, the user equipment of the present invention may include an indication sending module 800, a first controlling module 801, and a third controlling module 803.

The indication sending module 800 is configured to send a power consumption preference indication to a base station, where the power consumption preference indication includes a lower power consumption preference indication or a higher power consumption preference indication.

The first controlling module 801 is configured to determine, when a power consumption preference of the user equipment is changed to lower power consumption, whether a first timer used for restricting sending of a lower power consumption preference indication expires, and if a determination result is yes, notify the indication sending module 800 to send a lower power consumption preference indication to the base station.

The third controlling module 803 is configured to determine, when the power consumption preference of the user equipment is changed to higher power consumption, whether a second timer used for restricting sending of a higher power consumption preference indication expires, and if a determination result is yes, notify the indication sending module 800 to send a higher power consumption preference indication to the base station.

In some feasible implementation manners, sending of a power consumption preference indication ("power preference indication", including a lower power consumption preference indication and a higher power consumption preference indication) is performed based on two definite states of the user equipment. In this case, the user equipment has two states, a default state ("default" state) and a lower power consumption state ("lower power consumption" state). When the user equipment determines that the user equipment is in the "default (default)" state, the user equipment can only send a "lower power consumption (lower power consumption) preference indication to the base station (for example, an evolved NodeB eNB); conversely, if the user determines that the user is in the "lower power consumption" state, the user can only send a preference indication for returning to the "default" state (higher power consumption) to the base station. In this case, optionally, the user equipment further includes a state judging module 804. When the power consumption preference of the user equipment is changed to lower power consumption, and the state judging module 804 indicates that the user equipment is in the default state, the first controlling module 801 determines whether the first timer (which may be recorded as "T_Default") used for restricting sending of a lower power consumption preference indication expires (that is, the timer does not run), and if a determination result is yes, notifies the indication sending module 800 to send a lower power consumption preference indication to the base station; and when the power consumption preference of the user equipment is changed to higher power consumption, and the state judging module 804 indicates that the user equipment is in the lower power consumption state, the third controlling module 803 determines whether the second timer (which may be recorded as "T_LowerPower") used for restricting sending of a higher power consumption preference indication expires, and if a determination result is yes, notifies the indication sending module 800 to send a higher power consumption preference indication to the base station.

In some feasible implementation manners, a method for determining the state of the user equipment by the state judging module 804 may include:

determining, by the state judging module 804, the state of the user equipment according to a specified parameter length, and when the parameter length meets a length required by the default state, determining that the user equipment is in the default state, or when the parameter length meets a length required by the lower power consumption state, determining that the user equipment is in the lower power consumption state. For example, the state judging module 804 may determine the state of the user equipment by using a length of a discontinuous reception cycle (DRX cycle) in the user equipment; when the length of the DRX cycle currently configured for the user equipment is shorter than a length of a DRX cycle in the idle state, the state judging module 804 determines that the user equipment is in the "default" state; and when the length of the DRX cycle currently configured for the user equipment is longer than or equal to the length of the DRX cycle in the IDLE state, the state judging module 804 considers that the UE is in the "lower power consumption" state. The length of the DRX cycle in the idle state is used above as a threshold to distinguish the "default" and "lower power consumption" states, which is only an example. In specific implementation, lengths of other parameters may be used as thresholds for executing a determination. Thereby, when the state judging module 804 determines that the user equipment is using the length of the DRX cycle corresponding to the "default" state, that is, the user equipment is in the "default" state, if the power preference of the user equipment is changed and the user equipment expects lower power consumption, on a premise that the first timer expires, a "power preference indication" is sent to the base station, requesting to use a DRX parameter configuration corresponding to the "lower power consumption" state. When the state judging module 804 determines that the user equipment is using the length of the DRX cycle corresponding to the "lower power consumption" state, that is, the user equipment is in the "lower power consumption" state, if the power preference of the user equipment is changed and the user equipment expects higher performance, namely, higher power consumption, a "power preference indication" is sent to the base station, requesting to use a DRX parameter configuration corresponding to the "default" state.

In some feasible implementation manners, the method for determining the state of the user equipment by the state judging module 804 may include:

determining, by the state judging module 804, the state of the user equipment according to discontinuous reception DRX parameters configured by the base station for the user equipment, and when the user equipment is using discontinuous reception DRX parameters corresponding to the default state, determining that the user equipment is in the default state, or when the user equipment is using discontinuous reception DRX parameters corresponding to the lower power consumption state, determining that the user equipment is in the lower power consumption state.

In some feasible implementation manners, the base station may simultaneously configure the discontinuous reception DRX parameters corresponding to the default state and the discontinuous reception DRX parameters corresponding to the lower power consumption state for the user equipment, and explicitly or implicitly notify the user of the states corresponding to the parameters. Alternatively, the base station may also configure only a set of DRX parameters for the user equipment every time, and explicitly indicate a state corresponding to the DRX parameters. For example, the base station may configure two different sets of DRX parameters for the user equipment when setting up a radio resource management RRC connection. In addition, the base station may explicitly indicate which set of DRX parameters is used when the UE enters an RRC connected state (use the DRX parameters corresponding to "default", or use the DRX parameters corresponding to "lower power consumption"), that is, the UE is in which state; or it may be specified by default that the user equipment directly enters the "default" state when entering the RRC connected state, and uses the DRX parameters corresponding to the "default" state; or it may be specified by default that the user equipment directly enters the "lower power consumption" state when entering the RRC connected state, and uses the DRX parameters corresponding to the "lower power consumption" state. For another example, the base station may perform the configuration in an RRC connection reconfiguration process, that is, the base station configures two different sets of DRX parameters for the user equipment in an RRC connection reconfiguration process. Therefore, the base station may indicate which set of DRX parameters is used by the user equipment after the RRC connection reconfiguration process, that is, the user equipment is in which state. For another example, the base station implicitly indicates the state of the user equipment. A practice is that the user equipment determines the state of the user equipment by determining the currently used DRX parameters: if the user equipment finds that one set of the two sets of DRX parameters newly configured by the base station is the same as the DRX parameters currently used by the user equipment, the UE determines the state of the UE after the reconfiguration by using the state corresponding to the set of DRX parameters. Thereby, when the state judging module 804 determines that the user equipment is using the DRX parameters corresponding to the "default" state, that is, the user equipment is in the "default" state, if the power preference of the user equipment is changed and the user equipment expects lower power consumption, on a premise that the first timer expires, the user equipment sends a "power preference indication" to the base station, requesting to use a DRX parameter configuration corresponding to the "lower power consumption" state. When the state judging module 804 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, on a premise that the second timer expires, the user equipment sends a "power preference indication" to the base station, requesting to use a DRX parameter configuration corresponding to the "default" state.

In some feasible implementation manners, sending of a power consumption preference indication ("power preference indication", including a lower power consumption preference indication and a higher power consumption preference indication) may be not restricted by the state of the user equipment, that is, so long as the power consumption preference of the user equipment is changed, a power consumption preference indication may be sent to the base station. In this case, the user equipment may not include the state judging module 804. When the power consumption preference of the user equipment is changed to lower power consumption, the first controlling module 801 directly determines whether the first timer used for restricting sending of a lower power consumption preference indication expires, and if a determination result is yes, notifies the indication sending module 800 to send a lower power consumption preference indication to the base station; and when the power consumption preference of the user equipment is changed to higher power consumption, the third controlling module 803 directly determines whether the second timer used for restricting sending of a higher power consumption preference indication expires, and if a determination result is yes, notifies the indication sending module 800 to send a higher power consumption preference indication to the base station.

In some feasible implementation manners, optionally, when the determination result of determining by the first controlling module 801 whether the first timer expires is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the first controlling module 801 may further instruct the AS of the user equipment to notify the upper layer that sending of a "power preference indication" is restricted; and after the corresponding first timer expires, the first controller 801 may further instruct the AS to notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the first controlling module 801 instructs the user equipment to perform no operations.

In some feasible embodiments, optionally, when the determination result of determining by the third controlling module 803 whether the second timer expires is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the third controlling module 803 may instruct the AS of the user equipment to notify the upper layer that sending of a "power preference indication" is restricted; and after the second timer expires, the third controlling module 803 may instruct the AS of the user equipment to notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the third controlling module 803 instructs the user equipment to perform no operations.

In some feasible implementation manners, the length of the first timer and the length of the second timer may be preset in the user equipment. In this case, optionally, the user equipment may further include a setting module (not shown in the figure), configured to preset the length of the first timer and the length of the second timer in the user equipment.

In some feasible implementation manners, the length of the first timer and the length of the second timer are specified by the base station for the user equipment in a radio resource management connection setup process or a radio resource management connection reconfiguration process. In this case, optionally, the user equipment may further include a length receiving module (not shown in the figure), configured to receive the length of the first timer and the length of the second timer that are specified by the base station for the user equipment.

In some feasible implementation manners, the length of the first timer is longer than or equal to the length of the second timer.

In some feasible implementation manners, the user equipment may further include a timer acquiring module (not shown in the figure), configured to acquire at least one of a fourth timer and a fifth timer; and an indication determining module (not shown in the figure), configured to determine, when the fourth timer acquired by the timer acquiring module expires or the user equipment estimates that a duration of an idle state of the user equipment is longer than or equal to a length of the fourth timer acquired by the timer acquiring module, that the power consumption preference of the user equipment is changed to lower power consumption; and/or determine, when the fifth timer acquired by the timer acquiring module expires or the user equipment estimates that a duration of an idle state of the user equipment is shorter than or equal to a length of the fifth timer acquired by the timer acquiring module, that the power consumption preference of the user equipment is changed to higher power consumption.

In some feasible implementation manners, the timer acquiring module includes at least one of a first acquiring submodule and a second acquiring submodule, where:

the first acquiring submodule is configured to set the fourth timer according to a sixth timer, or acquire the fourth timer from the base station, where the sixth timer is a timer set in the base station; and the second acquiring submodule is configured to set the fifth timer according to a seventh timer, or acquire the fifth timer from the base station, where the seventh timer is a timer set in the base station.

In some feasible implementation manners, the length of the fourth timer is shorter than or equal to a length of the sixth timer, and the first acquiring submodule is further configured to acquire the sixth timer from the base station, or estimate, according to a message acquired from the base station, the length of the sixth timer set in the base station; and the length of the fifth timer is shorter than or equal to a length of the seventh timer, and the second acquiring submodule is further configured to acquire the seventh timer from the base station, or estimate, according to a message acquired from the base station, the length of the seventh timer set in the base station.

In some feasible implementation manners, the first acquiring submodule may acquire the fourth timer from the base station, and the second acquiring submodule may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to the length of the sixth timer in the base station, and the length of the fifth timer is shorter than or equal to the length of the seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the indication determining module knows that the fourth timer acquired by the first acquiring submodule expires, the indication determining module may determine that the power consumption preference of the user equipment is changed to lower power consumption, and when the indication determining module knows that the fifth timer acquired by the second acquiring submodule expires, determine that the power consumption preference of the user equipment is changed to higher power consumption.

In some feasible implementation manners, the first acquiring submodule may acquire the sixth timer from the base station, and the second acquiring submodule may acquire the seventh timer from the base station, where the sixth timer or the seventh timer or both may be acquired from at least one of a radio resource control protocol message, a physical layer message, a data link layer message, and a cell handover message sent by the base station. In specific implementation, when the first acquiring submodule acquires the sixth timer from the base station, the fourth timer may be set in the user equipment according to the sixth timer, and when the second acquiring submodule acquires the seventh timer from the base station, the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment itself may estimate the sixth timer according to a message acquired by the first acquiring submodule from the base station or estimate the length of the seventh timer according to a message acquired by the second acquiring submodule from the base station or estimate both. For example, the UE starts a timer after performing a data sending/receiving operation, and the timer is restarted after the UE performs a next data sending/receiving operation. Assuming that the base station delivers a reconfiguration message or an RRC connection release message to the user equipment, the first acquiring submodule may decide, according to content of the reconfiguration message or RRC connection release message, whether to record the length of the timer as the length of the sixth timer; and the second acquiring submodule may decide, according to content of the reconfiguration message or RRC connection release message, whether to record the length of the timer as the length of the seventh timer. For example, if the reconfiguration message or RRC connection release message is a handover command, or is used for setting up a new radio bearer, or releasing an original radio bearer, and so on, the first acquiring submodule or second acquiring submodule does not record the length of the timer as the length of the sixth timer; if the reconfiguration message or RRC connection release message is used for configuring DRX or configuring more power-saving DRX, the first acquiring submodule records the length of the timer as the length of the sixth timer.

In specific implementation, when recording the length of the sixth timer and the length of the seventh timer, the first acquiring submodule may set the fourth timer in the user equipment according to the sixth timer, and the second acquiring submodule may set the fifth timer according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the user equipment of the embodiment of the present invention may include only a timer acquiring module and an indication determining module, and such a user equipment may be dedicated to determining the power consumption preference of the user equipment.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 7:
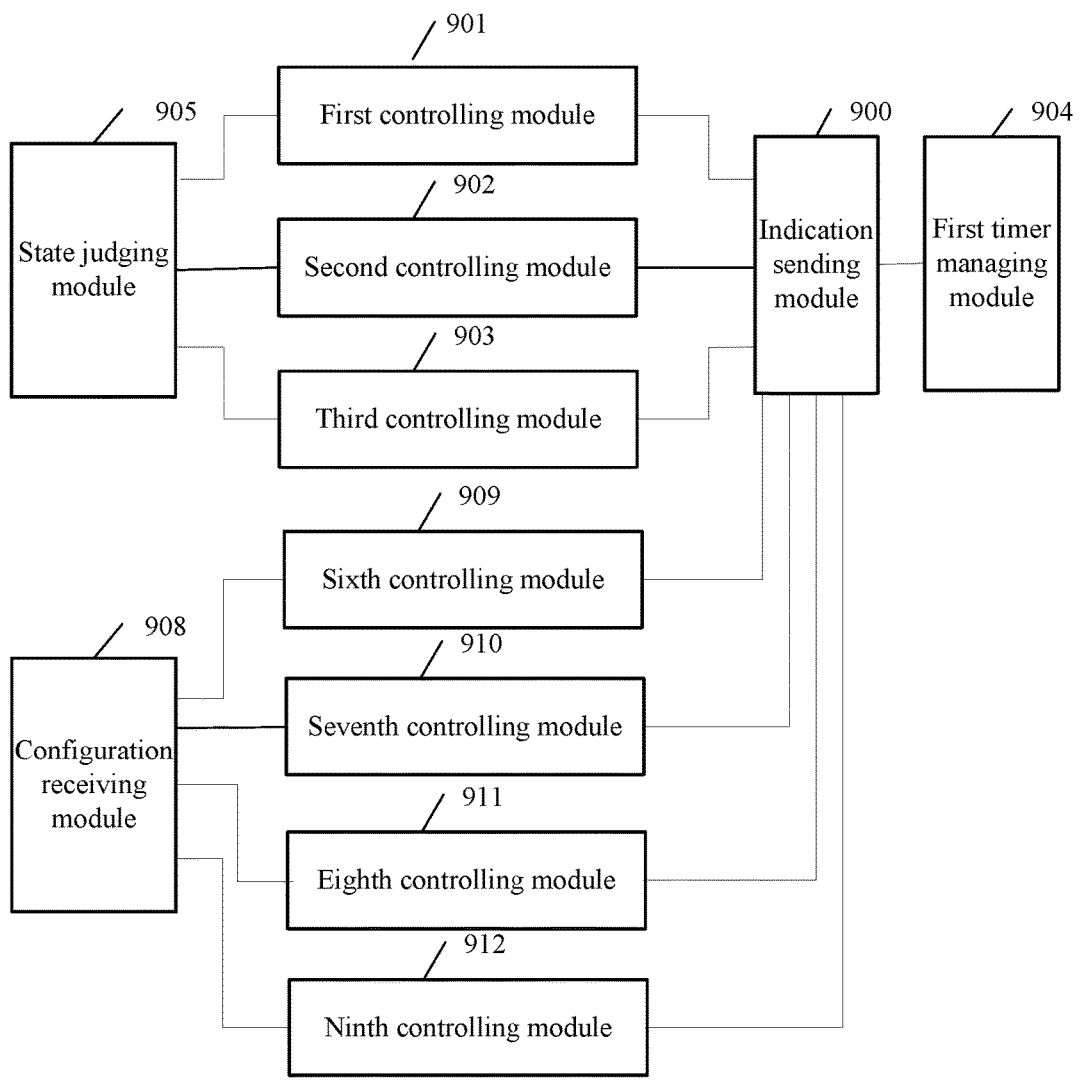
FIG. 7 is a schematic structural diagram of a third embodiment of a user equipment according to the present invention.

FIG. 7 is a schematic structural diagram of a third embodiment of a user equipment according to the present invention. The embodiment is an extension based on the second embodiment. As shown in FIG. 7, the user equipment may include an indication sending module 900, a first controlling module 901, a second controlling module 902, a third controlling module 903, and a first timer managing module 904, where at least one of the second controlling module 902 and the third controlling module 903 exists in the user equipment of the present invention.

The indication sending module 900 is configured to send a power consumption preference indication to a base station, where the power consumption preference indication includes a lower power consumption preference indication or a higher power consumption preference indication.

The first controlling module 901 is configured to determine, when a power consumption preference of the user equipment is changed to lower power consumption, whether a first timer used for restricting sending of a lower power consumption preference indication expires, and if a determination result is yes, notify the indication sending module 900 to send a lower power consumption preference indication to the base station.

The second controlling module 902 is configured to notify, when the power consumption preference of the user equipment is changed to higher power consumption, the indication sending module 900 to send a higher power consumption preference indication to the base station.

The third controlling module 903 is configured to determine, when the power consumption preference of the user equipment is changed to higher power consumption, whether a second timer used for restricting sending of a higher power consumption preference indication expires, and if a determination result is yes, notify the indication sending module 900 to send a higher power consumption preference indication to the base station.

The first timer managing module 904 is configured to start the first timer after the indication sending module 900 sends a power consumption preference indication to the base station and when the user equipment includes the first timer; and start the first timer or the second timer or both after the indication sending module 900 sends a power consumption preference indication to the base station and when the user equipment includes the first timer and the second timer.

In some feasible implementation manners, sending of a power consumption preference indication ("power preference indication", including a lower power consumption preference indication and a higher power consumption preference indication) is performed based on two definite states of the user equipment. In this case, the user equipment has two states, a default state ("default" state) and a lower power consumption state ("lower power consumption" state). When the user equipment determines that the user equipment is in the "default" state, the user equipment can only send a "lower power consumption preference indication to the base station (for example, an evolved NodeB eNB); conversely, if the user determines that the user is in the "lower power consumption" state, the user can only send a preference indication for returning to the "default" state (higher power consumption) to the base station. In this case, optionally, the user equipment of the present invention further includes a state judging module 905, configured to determine the state of the user equipment. The first controlling module 901 determines, when the power consumption preference of the user equipment is changed to lower power consumption, and the state judging module 905 indicates that the user equipment is in the default state, whether the first timer (which may be recorded as "T_Default") used for restricting sending of a lower power consumption preference indication expires (that is, the timer does not run), and if a determination result is yes, notifies the indication sending module 900 to send a lower power consumption preference indication to the base station; and the second controlling module 902 notifies, when the power consumption preference of the user equipment is changed to higher power consumption, and the state judging module 905 indicates that the user equipment is in the lower power consumption state, the indication sending module 900 to send a higher power consumption indication to the base station; and when the power consumption preference of the user equipment is changed to higher power consumption, and the state judging module 905 indicates that the user equipment is in the lower power consumption state, the third controlling module 903 determines whether the second timer (which may be recorded as "T_LowerPower") used for restricting sending of a higher power consumption preference indication expires, and if a determination result is yes, notifies the indication sending module 900 to send a higher power consumption preference indication to the base station.

In some feasible implementation manners, a method for determining the state of the user equipment by the state judging module 905 may include:

determining, by the state judging module 905, the state of the user equipment according to a specified parameter length, and when the parameter length meets a length required by the default state, determining that the user equipment is in the default state, or when the parameter length meets a length required by the lower power consumption state, determining that the user equipment is in the lower power consumption state. For example, the state judging module 905 may determine the state of the user equipment by using a length of a discontinuous reception cycle (DRX cycle) in the user equipment; when the length of the DRX cycle currently configured for the user equipment is shorter than a length of a DRX cycle in the idle state, the state judging module 905 determines that the user equipment is in the "default" state; and when the length of the DRX cycle currently configured for the user equipment is longer than or equal to the length of the DRX cycle in the IDLE state, the state judging module 905 considers that the UE is in the "lower power consumption" state. The length of the DRX cycle in the idle state is used above as a threshold to distinguish the "default" and "lower power consumption" states, which is only an example. In specific implementation, lengths of other parameters may be used as thresholds for executing a determination. Thereby, when the state judging module 905 determines that the user equipment is using the length of the DRX cycle corresponding to the "default" state, that is, the user equipment is in the "default" state, if the power preference of the user equipment is changed and the user equipment expects lower power consumption, on a premise that the first timer expires, a "power preference indication" is sent to the base station, requesting to use a DRX parameter configuration corresponding to the "lower power consumption" state. When the state judging module 905 determines that the user equipment is using the length of the DRX cycle corresponding to the "lower power consumption" state, that is, the user equipment is in the "lower power consumption" state, if the power preference of the user equipment is changed and the user equipment expects higher performance, namely, higher power consumption, a "power preference indication" is sent to the base station, requesting to use a DRX parameter configuration corresponding to the "default" state.

In some feasible implementation manners, the method for determining the state of the user equipment by the state judging module 905 may include:

determining, by the state judging module 905, the state of the user equipment according to discontinuous reception DRX parameters configured by the base station for the user equipment, and when the user equipment is using discontinuous reception DRX parameters corresponding to the default state, determining that the user equipment is in the default state, or when the user equipment is using discontinuous reception DRX parameters corresponding to the lower power consumption state, determining that the user equipment is in the lower power consumption state.

In some feasible implementation manners, the base station may simultaneously configure the discontinuous reception DRX parameters corresponding to the default state and the discontinuous reception DRX parameters corresponding to the lower power consumption state for the user equipment, and explicitly or implicitly notify the user of the states corresponding to the parameters. Alternatively, the base station may also configure only a set of DRX parameters for the user equipment every time, and explicitly indicate a state corresponding to the DRX parameters. For example, the base station may configure two different sets of DRX parameters for the user equipment when setting up a radio resource management RRC connection. In addition, the base station may explicitly indicate which set of DRX parameters is used when the UE enters an RRC connected state (use the DRX parameters corresponding to "default", or use the DRX parameters corresponding to "lower power consumption"), that is, the UE is in which state; or it may be specified by default that the user equipment directly enters the "default" state when entering the RRC connected state, and uses the DRX parameters corresponding to the "default" state; or it may be specified by default that the user equipment directly enters the "lower power consumption" state when entering the RRC connected state, and uses the DRX parameters corresponding to the "lower power consumption" state. For another example, the base station may perform the configuration in an RRC connection reconfiguration process, that is, the base station configures two different sets of DRX parameters for the user equipment in an RRC connection reconfiguration process. Therefore, the base station may indicate which set of DRX parameters is used by the user equipment after the RRC connection reconfiguration process, that is, the user equipment is in which state. For another example, the base station implicitly indicates the state of the user equipment. A practice is that the user equipment determines the state of the user equipment by determining the currently used DRX parameters: if the user equipment finds that one set of the two sets of DRX parameters newly configured by the base station is the same as the DRX parameters currently used by the user equipment, the UE determines the state of the UE after the reconfiguration by using the state corresponding to the set of DRX parameters. Thereby, when the state judging module 905 determines that the user equipment is using the DRX parameters corresponding to the "default" state, that is, the user equipment is in the "default" state, if the power preference of the user equipment is changed and the user equipment expects lower power consumption, on a premise that the first timer expires, the indication sending module 900 may send a "power preference indication" to the base station, requesting to use a DRX parameter configuration corresponding to the "lower power consumption" state. When the state judging module 905 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, on a premise that the second timer expires (on a premise that the user equipment includes the third controlling module 903), the indication sending module 900 may send a "power preference indication" to the base station, requesting to use a DRX parameter configuration corresponding to the "default" state; and when the state judging module 905 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, the indication sending module 900 may send a "power preference indication" to the base station (on a premise that the user equipment includes the second controlling module 902), requesting to use a DRX parameter configuration corresponding to the "default" state.

In some feasible implementation manners, sending of a power consumption preference indication ("power preference indication", including a lower power consumption preference indication and a higher power consumption preference indication) may be not restricted by the state of the user equipment, that is, so long as the power consumption preference of the user equipment is changed, a power consumption preference indication may be sent to the base station. In this case, the user equipment may not include the state judging module 905. When the power consumption preference of the user equipment is changed to lower power consumption, the first controlling module 901 directly determines whether the first timer used for restricting sending of a lower power consumption preference indication expires, and if a determination result is yes, notifies the indication sending module 900 to send a lower power consumption preference indication to the base station; when the power consumption preference of the user equipment is changed to higher power consumption, the second controlling module 902 directly notifies the indication sending module 900 to send a higher power consumption preference indication to the base station; and when the power consumption preference of the user equipment is changed to higher power consumption, the third controlling module 903 directly determines whether the second timer used for restricting sending of a higher power consumption preference indication expires, and if a determination result is yes, notifies the indication sending module 900 to send a higher power consumption preference indication to the base station.

In some feasible implementation manners, optionally, when the determination result of determining by the first controlling module 901 whether the first timer expires is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the first controlling module 901 may further instruct the AS of the user equipment to notify the upper layer that sending of a "power preference indication" is restricted; and after the corresponding first timer expires, the AS of the user equipment is instructed to notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the first controlling module 901 may notify the user equipment to perform no operations.

In some feasible embodiments, optionally, when the determination result of determining by the third controlling module 903 whether the second timer expires is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the third controlling module 903 may instruct the AS of the user equipment to notify the upper layer that sending of a "power preference indication" is restricted; and after the second timer expires, the third controlling module 903 may instruct the AS of the user equipment to notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the third controlling module 903 instructs the user equipment to perform no operations.

In some feasible implementation manners, the length of the first timer and the length of the second timer may be preset in the user equipment. In this case, optionally, the user equipment may further include a setting module (not shown in the figure), configured to preset the length of the first timer and the length of the second timer in the user equipment.

In some feasible implementation manners, the length of the first timer and the length of the second timer are specified by the base station for the user equipment in a radio resource management connection setup process or a radio resource management connection reconfiguration process. In this case, optionally, the user equipment may further include a length receiving module (not shown in the figure), configured to receive the length of the first timer and the length of the second timer that are specified by the base station for the user equipment.

In some feasible implementation manners, the length of the first timer is longer than or equal to the length of the second timer.

In some feasible implementation manners, the user equipment may further include a timer acquiring module (not shown in the figure), configured to acquire at least one of a fourth timer and a fifth timer; and an indication determining module (not shown in the figure), configured to determine, when the fourth timer acquired by the timer acquiring module expires or the user equipment estimates that a duration of an idle state of the user equipment is longer than or equal to a length of the fourth timer acquired by the timer acquiring module, that the power consumption preference of the user equipment is changed to lower power consumption; and/or determine, when the fifth timer acquired by the timer acquiring module expires or the user equipment estimates that a duration of an idle state of the user equipment is shorter than or equal to a length of the fifth timer acquired by the timer acquiring module, that the power consumption preference of the user equipment is changed to higher power consumption.

In some feasible implementation manners, the timer acquiring module includes at least one of a first acquiring submodule and a second acquiring submodule, where:

the first acquiring submodule is configured to set the fourth timer according to a sixth timer, or acquire the fourth timer from the base station, where the sixth timer is a timer set in the base station; and the second acquiring submodule is configured to set the fifth timer according to a seventh timer, or acquire the fifth timer from the base station, where the seventh timer is a timer set in the base station.

In some feasible implementation manners, the length of the fourth timer is shorter than or equal to a length of the sixth timer, and the first acquiring submodule is further configured to acquire the sixth timer from the base station, or estimate, according to a message acquired from the base station, the length of the sixth timer set in the base station; and the length of the fifth timer is shorter than or equal to a length of the seventh timer, and the second acquiring submodule is further configured to acquire the seventh timer from the base station, or estimate, according to a message acquired from the base station, the length of the seventh timer set in the base station.

In some feasible implementation manners, the first acquiring submodule may acquire the fourth timer from the base station, and the second acquiring submodule may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to the length of the sixth timer in the base station, and the length of the fifth timer is shorter than or equal to the length of the seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the indication determining module knows that the fourth timer acquired by the first acquiring submodule expires, the indication determining module may determine that the power consumption preference of the user equipment is changed to lower power consumption, and when the indication determining module knows that the fifth timer acquired by the second acquiring submodule expires, determine that the power consumption preference of the user equipment is changed to higher power consumption.

In some feasible implementation manners, the first acquiring submodule may acquire the sixth timer from the base station, and the second acquiring submodule may acquire the seventh timer from the base station, where the sixth timer or the seventh timer or both may be acquired from at least one of a radio resource control protocol message, a physical layer message, a data link layer message, and a cell handover message sent by the base station. In specific implementation, when the first acquiring submodule acquires the sixth timer from the base station, the fourth timer may be set in the user equipment according to the sixth timer, and when the second acquiring submodule acquires the seventh timer from the base station, the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment itself may estimate the sixth timer according to a message acquired by the first acquiring submodule from the base station or estimate the length of the seventh timer according to a message acquired by the second acquiring submodule from the base station or estimate both. For example, the UE starts a timer after performing a data sending/receiving operation, and the timer is restarted after the UE performs a next data sending/receiving operation. Assuming that the base station delivers a reconfiguration message or an RRC connection release message to the user equipment, the first acquiring submodule may decide, according to content of the reconfiguration message or RRC connection release message, whether to record the length of the timer as the length of the sixth timer; and the second acquiring submodule may decide, according to content of the reconfiguration message or RRC connection release message, whether to record the length of the timer as the length of the seventh timer. For example, if the reconfiguration message or RRC connection release message is a handover command, or is used for setting up a new radio bearer, or releasing an original radio bearer, and so on, the first acquiring submodule or second acquiring submodule does not record the length of the timer as the length of the sixth timer; if the reconfiguration message or RRC connection release message is used for configuring DRX or configuring more power-saving DRX, the first acquiring submodule records the length of the timer as the length of the sixth timer.

In specific implementation, when recording the length of the sixth timer and the length of the seventh timer, the first acquiring submodule may set the fourth timer in the user equipment according to the sixth timer, and the second acquiring submodule may set the fifth timer according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station.

Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the user equipment of the embodiment of the present invention may include only a timer acquiring module and an indication determining module, and such a user equipment may be dedicated to determining the power consumption preference of the user equipment.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

In some feasible embodiments, when the user equipment has two definite states, when the user equipment is in the default state, the first timer managing module 904 may start only the first timer; and when the user equipment is in the lower power consumption state, the first timer managing module 904 may start only the second timer. If the user equipment includes only the first timer, the first timer managing module 904 does not need to start the timer when the user is in the lower power consumption state. If the user equipment is not restricted by the state, the first timer managing module 904 may start the first timer and the second timer simultaneously; and if the user equipment includes only the first timer, the first timer managing module 904 starts only the first timer.

In some feasible implementation manners, optionally, the user equipment may further include a configuration receiving module 908, and on a basis of including the configuration receiving module 908, the user equipment may further include at least one of a sixth controlling module 909 and a seventh controlling module 910 (in this case, the user equipment may not include an eighth controlling module 911 and a ninth controlling module 912).

The configuration receiving module 908 is configured to receive a radio resource parameter configuration result configured by the base station for the user equipment.

The sixth controlling module 909 is configured to notify, when the first timer in the user equipment does not expire, but the configuration receiving module 908 receives a radio resource parameter configuration result, and when the power consumption preference of the user equipment is changed to lower power consumption again, the indication sending module 900 that the indication sending module 900 is unable to send a lower power consumption preference indication to the base station before the first timer expires.

The seventh controlling module 910 is configured to notify, when the second timer in the user equipment does not expire, but the configuration receiving module 908 receives a radio resource parameter configuration result sent by the base station, and when the power consumption preference of the user equipment is changed to higher power consumption again, the indication sending module 900 that the indication sending module 900 is unable to send a higher power consumption preference indication to the base station before the second timer expires.

In some feasible implementation manners, optionally, the user equipment may further include the configuration receiving module 908, and on the basis of including the configuration receiving module 908, the user equipment may further include at least one of the eighth controlling module 911 and the ninth controlling module 912 (in this case, the user equipment may not include the sixth controlling module 909 and the seventh controlling module 910).

The configuration receiving module 908 is configured to receive a radio resource parameter configuration result configured by the base station for the user equipment.

The eighth controlling module 911 is configured to notify, when the first timer in the user equipment expires, but the configuration receiving module 908 receives no radio resource parameter configuration result sent by the base station, and when the power consumption preference of the user equipment is changed to lower power consumption again, the indication sending module 900 that the indication sending module 900 is unable to send a lower power consumption preference indication to the base station before the configuration receiving module 908 receives a radio resource parameter configuration result sent by the base station.

The ninth controlling module 912 is configured to notify, when the second timer in the user equipment expires, but the configuration receiving module 908 receives no radio resource parameter configuration result sent by the base station, and when the power consumption preference of the user equipment is changed to higher power consumption again, the indication sending module 900 that the indication sending module 900 is unable to send a higher power consumption preference indication to the base station before the configuration receiving module 908 receives a radio resource parameter configuration result sent by the base station.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Figure 8:
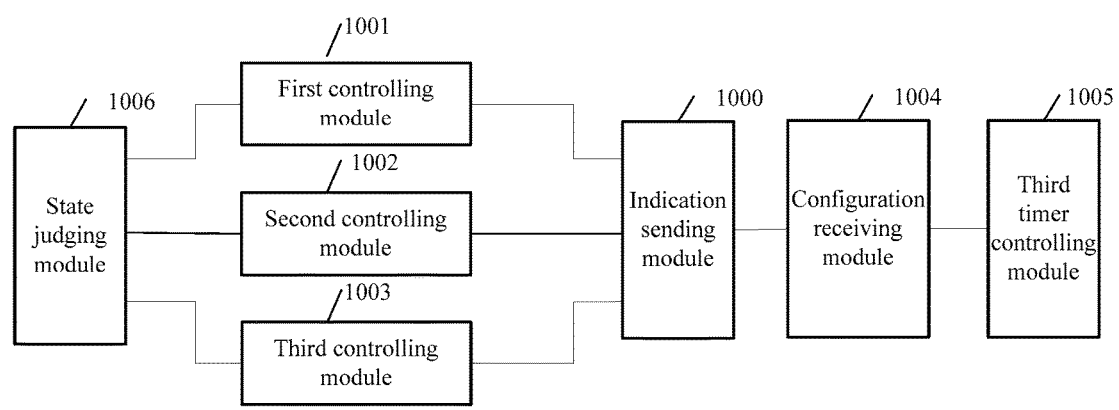
FIG. 8 is a schematic structural diagram of a fourth embodiment of a user equipment according to the present invention.
Figure 9:
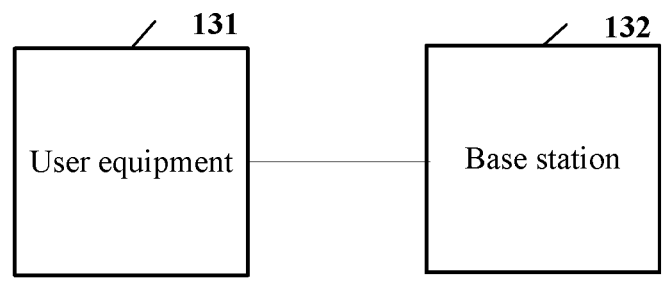
FIG. 9 is a schematic structural diagram of an embodiment of a system for sending signaling according to the present invention.

FIG. 8 is a schematic structural diagram of a fourth embodiment of a user equipment according to the present invention. As shown in FIG. 8, the user equipment of this embodiment may include an indication sending module 1000, a first controlling module 1001, a second controlling module 1002, a third controlling module 1003, a configuration receiving module 1004, and a third timer managing module 1005, where at least one of the second controlling module 1002 and the third controlling module 1003 exists in the user equipment of the present invention.

The indication sending module 1000 is configured to send a power consumption preference indication to a base station, where the power consumption preference indication includes a lower power consumption preference indication or a higher power consumption preference indication.

The first controlling module 1001 is configured to determine, when a power consumption preference of the user equipment is changed to lower power consumption, whether a first timer used for restricting sending of a lower power consumption preference indication expires, and if a determination result is yes, notify the indication sending module 1000 to send a lower power consumption preference indication to the base station.

The second controlling module 1002 is configured to notify, when the power consumption preference of the user equipment is changed to higher power consumption, the indication sending module 1000 to send a higher power consumption preference indication to the base station.

The third controlling module 1003 is configured to determine, when the power consumption preference of the user equipment is changed to higher power consumption, whether a second timer used for restricting sending of a higher power consumption preference indication expires, and if a determination result is yes, notify the indication sending module 1000 to send a higher power consumption preference indication to the base station.

The configuration receiving module 1004 is configured to receive a radio resource parameter configuration result configured by the base station for the user equipment.

The third timer managing module 1005 is configured to start the first timer after the configuration receiving module 1004 receives the radio resource parameter configuration result when the user equipment includes the first timer; and start the first timer or the second timer or both when the user equipment includes the first timer and the second timer.

In some feasible implementation manners, sending of a power consumption preference indication ("power preference indication", including a lower power consumption preference indication and a higher power consumption preference indication) is performed based on two definite states of the user equipment. In this case, the user equipment has two states, a default state and a lower power consumption state ("lower power consumption" state). When the user equipment determines that the user equipment is in the "default" state, the user equipment can only send a "lower power consumption (lower power consumption) preference indication to the base station (for example, an evolved NodeB eNB); conversely, if the user determines that the user is in the "lower power consumption" state, the user can only send a preference indication for returning to the "default" state (higher power consumption) to the base station. In this case, optionally, the user equipment of the present invention further includes a state judging module 1006, configured to determine the state of the user equipment. The first controlling module 1001 determines, when the power consumption preference of the user equipment is changed to lower power consumption, and the state judging module 1006 indicates that the user equipment is in the default state, whether the first timer (which may be recorded as "T_Default") used for restricting sending of a lower power consumption preference indication expires (that is, the timer does not run), and if a determination result is yes, notifies the indication sending module 1000 to send a lower power consumption preference indication to the base station; and the second controlling module 1002 notifies, when the power consumption preference of the user equipment is changed to higher power consumption, and the state judging module 1006 indicates that the user equipment is in the lower power consumption state, the indication sending module 1000 to send a higher power consumption indication to the base station; and when the power consumption preference of the user equipment is changed to higher power consumption, and the state judging module 1006 indicates that the user equipment is in the lower power consumption state, the third controlling module 1003 determines whether the second timer (which may be recorded as "T_LowerPower") used for restricting sending of a higher power consumption preference indication expires, and if a determination result is yes, notifies the indication sending module 1000 to send a higher power consumption preference indication to the base station.

In some feasible implementation manners, a method for determining the state of the user equipment by the state judging module 1006 may include:

determining, by the state judging module 1006, the state of the user equipment according to a specified parameter length, and when the parameter length meets a length required by the default state, determining that the user equipment is in the default state, or when the parameter length meets a length required by the lower power consumption state, determining that the user equipment is in the lower power consumption state. For example, the state judging module 1006 may determine the state of the user equipment by using a length of a discontinuous reception cycle (DRX cycle) in the user equipment; when the length of the DRX cycle currently configured for the user equipment is shorter than a length of a DRX cycle in the idle state, the state judging module 1006 determines that the user equipment is in the "default" state; and when the length of the DRX cycle currently configured for the user equipment is longer than or equal to the length of the DRX cycle in the IDLE state, the state judging module 1006 considers that the UE is in the "lower power consumption" state. The length of the DRX cycle in the idle state is used above as a threshold to distinguish the "default" and "lower power consumption" states, which is only an example. In specific implementation, lengths of other parameters may be used as thresholds for executing a determination. Thereby, when the state judging module 1006 determines that the user equipment is using the length of the DRX cycle corresponding to the "default" state, that is, the user equipment is in the "default" state, if the power preference of the user equipment is changed and the user equipment expects lower power consumption, on a premise that the first timer expires, a "power preference indication" is sent to the base station, requesting to use a DRX parameter configuration corresponding to the "lower power consumption" state. When the state judging module 1006 determines that the user equipment is using the length of the DRX cycle corresponding to the "lower power consumption" state, that is, the user equipment is in the "lower power consumption" state, if the power preference of the user equipment is changed and the user equipment expects higher performance, namely, higher power consumption, a "power preference indication" is sent to the base station, requesting to use a DRX parameter configuration corresponding to the "default" state.

In some feasible implementation manners, the method for determining the state of the user equipment by the state judging module 1006 may include:

determining, by the state judging module 1006, the state of the user equipment according to discontinuous reception DRX parameters configured by the base station for the user equipment, and when the user equipment is using discontinuous reception DRX parameters corresponding to the default state, determining that the user equipment is in the default state, or when the user equipment is using discontinuous reception DRX parameters corresponding to the lower power consumption state, determining that the user equipment is in the lower power consumption state.

In some feasible implementation manners, the base station may simultaneously configure the discontinuous reception DRX parameters corresponding to the default state and the discontinuous reception DRX parameters corresponding to the lower power consumption state for the user equipment, and explicitly or implicitly notify the user of the states corresponding to the parameters. Alternatively, the base station may also configure only a set of DRX parameters for the user equipment every time, and explicitly indicate a state corresponding to the DRX parameters. For example, the base station may configure two different sets of DRX parameters for the user equipment when setting up a radio resource management RRC connection. In addition, the base station may explicitly indicate which set of DRX parameters is used when the UE enters an RRC connected state (use the DRX parameters corresponding to "default", or use the DRX parameters corresponding to "lower power consumption"), that is, the UE is in which state; or it may be specified by default that the user equipment directly enters the "default" state when entering the RRC connected state, and uses the DRX parameters corresponding to the "default" state; or it may be specified by default that the user equipment directly enters the "lower power consumption" state when entering the RRC connected state, and uses the DRX parameters corresponding to the "lower power consumption" state. For another example, the base station may perform the configuration in an RRC connection reconfiguration process, that is, the base station configures two different sets of DRX parameters for the user equipment in an RRC connection reconfiguration process. Therefore, the base station may indicate which set of DRX parameters is used by the user equipment after the RRC connection reconfiguration process, that is, the user equipment is in which state. For another example, the base station implicitly indicates the state of the user equipment. A practice is that the user equipment determines the state of the user equipment by determining the currently used DRX parameters: if the user equipment finds that one set of the two sets of DRX parameters newly configured by the base station is the same as the DRX parameters currently used by the user equipment, the UE determines the state of the UE after the reconfiguration by using the state corresponding to the set of DRX parameters. Thereby, when the state judging module 1006 determines that the user equipment is using the DRX parameters corresponding to the "default" state, that is, the user equipment is in the "default" state, if the power preference of the user equipment is changed and the user equipment expects lower power consumption, on a premise that the first timer expires, the indication sending module 1000 may send a "power preference indication" to the base station, requesting to use a DRX parameter configuration corresponding to the "lower power consumption" state. When the state judging module 1006 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, on a premise that the second timer expires (on a premise that the user equipment includes the third controlling module 1003), the indication sending module 1000 may send a "power preference indication" to the base station, requesting to use a DRX parameter configuration corresponding to the "default" state; and when the state judging module 1006 determines that the user equipment is using the DRX parameters corresponding to the "lower power consumption" state, that is, the user equipment is in the "lower power consumption" state, if the power preference of the user equipment is changed and the user equipment expects higher performance, namely, higher power consumption, the indication sending module 1000 may send a "power preference indication" to the base station (on a premise that the user equipment includes the second controlling module 1002), requesting to use a DRX parameter configuration corresponding to the "default" state.

In some feasible implementation manners, sending of a power consumption preference indication ("power preference indication", including a lower power consumption preference indication and a higher power consumption preference indication) may be not restricted by the state of the user equipment, that is, so long as the power consumption preference of the user equipment is changed, a power consumption preference indication may be sent to the base station. In this case, the user equipment may not include the state judging module 1006. When the power consumption preference of the user equipment is changed to lower power consumption, the first controlling module 1001 directly determines whether the first timer used for restricting sending of a lower power consumption preference indication expires, and if a determination result is yes, notifies the indication sending module 1000 to send a lower power consumption preference indication to the base station; and when the power consumption preference of the user equipment is changed to higher power consumption, the second controlling module 1002 directly notifies the indication sending module 1000 to send a higher power consumption preference indication to the base station; and when the power consumption preference of the user equipment is changed to higher power consumption, the third controlling module 1003 directly determines whether the second timer used for restricting sending of a higher power consumption preference indication expires, and if a determination result is yes, notifies the indication sending module 1000 to send a higher power consumption preference indication to the base station.

In some feasible implementation manners, optionally, when the determination result of determining by the first controlling module 1001 whether the first timer expires is no, that is, the first timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the first controlling module 1001 may further instruct the AS of the user equipment to notify the upper layer that sending of a "power preference indication" is restricted; and after the corresponding first timer expires, the AS of the user equipment is instructed to notify the upper layer that sending is not restricted. However, after the upper layer of the AS receives the non-restriction indication, if the upper layer determines that the user equipment still needs to send a lower power consumption preference indication, the access stratum AS may be notified; otherwise, if the user equipment does not need to send a lower power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the first controlling module 1001 may notify the user equipment to perform no operations.

In some feasible embodiments, optionally, when the determination result of determining by the third controlling module 1003 whether the second timer expires is no, that is, the second timer is still running, if the user equipment determines the change of the power preference at a protocol layer different from a protocol layer at which the user equipment performs sending of a "power preference indication" and a timer management operation, (for ease of description, the protocol layer at which the user equipment performs sending of a "power preference indication" and a timer management operation may be called an AS (access stratum), and the protocol layer at which the power preference is determined is called an upper layer of the AS), the third controlling module 1003 may instruct the AS of the user equipment to notify the upper layer that sending of a "power preference indication" is restricted; and after the second timer expires, the third controlling module 1003 may instruct the AS of the user equipment to notify the upper layer that sending is not restricted. However, after the upper layer of the AS receives the non-restriction indication, if the upper layer determines that the user equipment still needs to send a higher power consumption preference indication, the access stratum AS may be notified; otherwise, if the user equipment does not need to send a higher power consumption preference indication, no operations are performed. If the user equipment determines the power preference at a protocol layer same as a protocol layer at which the user equipment performs sending of a "power preference indication" and a timer management operation, (the protocol layer is not specifically defined herein, and the executor is collectively called a user equipment), the third controlling module 1003 instructs the user equipment to perform no operations.

In some feasible implementation manners, the length of the first timer and the length of the second timer may be preset in the user equipment. In this case, optionally, the user equipment may further include a setting module (not shown in the figure), configured to preset the length of the first timer and the length of the second timer in the user equipment.

In some feasible implementation manners, the length of the first timer and the length of the second timer are specified by the base station for the user equipment in a radio resource management connection setup process or a radio resource management connection reconfiguration process. In this case, optionally, the user equipment may further include a length receiving module (not shown in the figure), configured to receive the length of the first timer and the length of the second timer that are specified by the base station for the user equipment.

In some feasible implementation manners, the length of the first timer is longer than or equal to the length of the second timer.

In some feasible implementation manners, the user equipment may further include a timer acquiring module (not shown in the figure), configured to acquire at least one of a fourth timer and a fifth timer; and an indication determining module (not shown in the figure), configured to determine, when the fourth timer acquired by the timer acquiring module expires or the user equipment estimates that a duration of an idle state of the user equipment is longer than or equal to a length of the fourth timer acquired by the timer acquiring module, that the power consumption preference of the user equipment is changed to lower power consumption; and/or determine, when the fifth timer acquired by the timer acquiring module expires or the user equipment estimates that a duration of an idle state of the user equipment is shorter than or equal to a length of the fifth timer acquired by the timer acquiring module, that the power consumption preference of the user equipment is changed to higher power consumption.

In some feasible implementation manners, the timer acquiring module includes at least one of a first acquiring submodule and a second acquiring submodule, where:

the first acquiring submodule is configured to set the fourth timer according to a sixth timer, or acquire the fourth timer from the base station, where the sixth timer is a timer set in the base station; and the second acquiring submodule is configured to set the fifth timer according to a seventh timer, or acquire the fifth timer from the base station, where the seventh timer is a timer set in the base station.

In some feasible implementation manners, the length of the fourth timer is shorter than or equal to a length of the sixth timer, and the first acquiring submodule is further configured to acquire the sixth timer from the base station, or estimate, according to a message acquired from the base station, the length of the sixth timer set in the base station; and the length of the fifth timer is shorter than or equal to a length of the seventh timer, and the second acquiring submodule is further configured to acquire the seventh timer from the base station, or estimate, according to a message acquired from the base station, the length of the seventh timer set in the base station.

In some feasible implementation manners, the first acquiring submodule may acquire the fourth timer from the base station, and the second acquiring submodule may acquire the fifth timer from the base station, where the fourth timer or the fifth timer or both may be acquired from at least one of a radio resource control protocol message, a physical layer message, a data link layer message, and a cell handover message sent by the base station. In specific implementation, the length of the fourth timer is shorter than or equal to the length of the sixth timer in the base station, and the length of the fifth timer is shorter than or equal to the length of the seventh timer in the base station. The sixth timer is a trigger that is maintained in the base station and used by the base station side to trigger lower power consumption, and the seventh timer is a trigger that is maintained in the base station and used by the base station side to trigger higher power consumption. Thereby, when the indication determining module knows that the fourth timer acquired by the first acquiring submodule expires, the indication determining module may determine that the power consumption preference of the user equipment is changed to lower power consumption, and when the indication determining module knows that the fifth timer acquired by the second acquiring submodule expires, determine that the power consumption preference of the user equipment is changed to higher power consumption.

In some feasible implementation manners, the first acquiring submodule may acquire the sixth timer from the base station, and the second acquiring submodule may acquire the seventh timer from the base station, where the sixth timer or the seventh timer or both may be acquired from at least one of a radio resource control protocol message, a physical layer message, a data link layer message, and a cell handover message sent by the base station. In specific implementation, when the first acquiring submodule acquires the sixth timer from the base station, the fourth timer may be set in the user equipment according to the sixth timer, and when the second acquiring submodule acquires the seventh timer from the base station, the fifth timer may be set according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment itself may estimate the sixth timer according to a message acquired by the first acquiring submodule from the base station or estimate the length of the seventh timer according to a message acquired by the second acquiring submodule from the base station or estimate both. For example, the UE starts a timer after performing a data sending/receiving operation, and the timer is restarted after the UE performs a next data sending/receiving operation. Assuming that the base station delivers a reconfiguration message or an RRC connection release message to the user equipment, the first acquiring submodule may decide, according to content of the reconfiguration message or RRC connection release message, whether to record the length of the timer as the length of the sixth timer; and the second acquiring submodule may decide, according to content of the reconfiguration message or RRC connection release message, whether to record the length of the timer as the length of the seventh timer. For example, if the reconfiguration message or RRC connection release message is a handover command, or is used for setting up a new radio bearer, or releasing an original radio bearer, and so on, the first acquiring submodule or second acquiring submodule does not record the length of the timer as the length of the sixth timer; if the reconfiguration message or RRC connection release message is used for configuring DRX or configuring more power-saving DRX, the first acquiring submodule records the length of the timer as the length of the sixth timer.

In specific implementation, when recording the length of the sixth timer and the length of the seventh timer, the first acquiring submodule may set the fourth timer in the user equipment according to the sixth timer, and the second acquiring submodule may set the fifth timer according to the seventh timer. Furthermore, the length of the set fourth timer may be shorter than or equal to the length of the sixth timer, and the length of the set fifth timer may be shorter than or equal to the length of the seventh timer. Thereby, when the indication determining module knows that the fourth timer acquired by the first acquiring submodule expires, the indication determining module determines that the power consumption preference of the user equipment is changed to lower power consumption, and when the indication determining module knows that the fifth timer acquired by the second acquiring submodule expires, determines that the power consumption preference of the user equipment is changed to higher power consumption.

In some feasible implementation manners, the user equipment may acquire the length of the sixth timer or the seventh timer or both by performing multiple estimations, for example, by averaging multiple estimation results, or using a minimum value, or using a maximum value, where each estimation process is the same as the foregoing estimation method and is not repeated herein, so as to increase accuracy of the acquired length of the sixth timer or the seventh timer or both.

In some feasible implementation manners, when the user equipment completes a data sending/receiving operation and enters an idle state, the user equipment may estimate a duration of the idle state of the user equipment (in specific implementation, the user equipment may estimate the duration of the idle state of the user equipment according to factors such as a service type of data being sent or received by the user equipment and a current network condition), for example, 10 s. Meanwhile, the user equipment may set the fourth time according to the sixth timer received from the base station; assuming that the sixth timer is 8 s, the user equipment may set the fourth timer to 5 s, or directly receive the fourth timer (for example, 11 s) from the base station. Thereby, when the user equipment estimates that the duration of the idle state of the user equipment (for example, the 10 s) is longer than or equal to the length of the fourth timer of the user equipment (for example, the 5 s), it is determined that the power consumption preference of the user equipment is changed to lower power consumption. If the user equipment estimates that the duration of the idle state of the user equipment (for example, the 10 s) is shorter than the length of the fourth timer of the user equipment (for example, the 11 s), a conclusion that the preference is changed to lower power consumption cannot be reached. The fifth timer is similar thereto and is not repeated herein.

In specific implementation, the user equipment of the embodiment of the present invention may include only a timer acquiring module and an indication determining module, and such a user equipment may be dedicated to determining the power consumption preference of the user equipment.

In some feasible implementation manners, after the base station receives a lower power consumption preference indication, the base station configures DRX parameters corresponding to the lower power consumption ("lower power consumption") state and physical layer parameters (such as CQI, Sounding) for the user equipment, where a practice may be as follows:

During an RRC connection reconfiguration, the base station configures two sets of discontinuous reception DRX parameters for the user equipment, and instructs the user equipment to use, when the user equipment performs a radio resource management connection, the DRX parameters corresponding to "lower power consumption"; and the base station configures two sets of physical layer parameters for the user equipment according to the two sets of discontinuous reception DRX parameters, and instructs the user equipment to use, when the user equipment performs a radio resource management connection, physical layer parameters corresponding to the DRX parameters corresponding to "lower power consumption".

In some feasible implementation manners, after the base station receives a higher power consumption preference indication, the base station configures DRX parameters corresponding to the higher power consumption ("default") state and physical layer parameters (such as CQI, Sounding) for the user equipment, where a practice may be as follows:

During an RRC connection reconfiguration, the base station configures two sets of discontinuous reception DRX parameters for the user equipment, and instructs the user equipment to use, when the user equipment performs a radio resource management connection, the DRX parameters corresponding to "default"; and the base station configures two sets of physical layer parameters for the user equipment according to the two sets of discontinuous reception DRX parameters, and instructs the user equipment to use, when the user equipment performs a radio resource management connection, physical layer parameters corresponding to the DRX parameters corresponding to "default".

In some feasible implementation manners, the setting, by the base station, the DRX parameters include setting the length of the DRX cycle. After receiving a lower power consumption preference indication, the base station may set the length of the DRX cycle to be shorter than the length of the DRX cycle in the IDLE state. After receiving a higher power consumption preference indication, the base station may set the length of the DRX cycle to be longer than or equal to the length of the DRX cycle in the IDLE state.

In some feasible embodiments, the user equipment may also implicitly determine the used DRX parameters by determining the current state of the user equipment: When the user equipment is currently in the "default" state, if the base station does not definitely instruct the user equipment to change the state, the user equipment uses new DRX parameters corresponding to the "default" state; otherwise, when the user equipment is currently in the "lower power consumption" state, if the base station does not definitely instruct the user equipment to change the state, the user equipment uses new DRX parameters corresponding to the "lower power consumption" state.

In some feasible implementation manners, optionally, after the user equipment sends a lower power consumption preference indication to the base station or sends a higher power consumption preference indication to the base station, the base station may determine whether a radio resource parameter configuration can be updated for the user equipment currently, and if a determination result is no, the base station does not respond to the lower power consumption preference indication or the base station does not respond to the higher power consumption preference indication.

In some feasible implementation manners, optionally, after the user equipment sends a lower power consumption preference indication to the base station, the base station determines whether a radio resource parameter configuration can be updated for the user equipment currently, and if a determination result is no, the base station does not respond to the lower power consumption preference indication.

In some feasible embodiments, when the user equipment has two definite states, when the user equipment is in the default state, the third timer managing module 1005 may start only the first timer; and when the user equipment is in the lower power consumption state, the third timer managing module 1005 may start only the second timer. If the user equipment includes only the first timer, the third timer managing module 1005 does not need to start the timer when the user is in the lower power consumption state. If the user equipment is not restricted by the state, the third timer managing module 1005 may start the first timer and the second timer simultaneously; and if the user equipment includes only the first timer, the third timer managing module 1005 starts only the first timer.

As may be seen above, in some feasible implementation manners of the present invention, a first timer is used to restrict sending of a lower power consumption preference indication by a user equipment, and a second timer is used to restrict sending of a higher power consumption preference indication, thereby separately restricting the sending of a lower power consumption preference indication and the sending of a higher power consumption preference indication by the user equipment, which is more flexible and achieves better user experience than the prior art in which restriction is performed by using a same timer. Furthermore, in the embodiment of the present invention, a fourth timer controlled by a sixth timer of a network side controls whether the user equipment enters a lower power consumption preference, and a fifth timer controlled by a seventh timer of the network side controls a higher power consumption preference; therefore, power preference requirements of the network side and the user equipment are more effectively coordinated, and it is ensured that the user equipment adjusts the power preference within the shortest time. A disadvantage of failing to adjust power preferences in time due to a conflict of durations of a network-side timer and a user equipment side timer can be effectively solved. Furthermore, in the embodiment of the present invention, the fourth timer and the fifth timer are used with the duration of the idle state of the user equipment estimated by the user equipment to jointly control whether the user equipment enters a lower power consumption or higher power consumption preference; therefore, power preference requirements of the user equipment are more effectively coordinated, and it is ensured that the user equipment adjusts the power preference within the shortest time.

Correspondingly, an embodiment of the present invention further provides a system for sending signaling. The system may include a user equipment 131 and a base station 132, where the user equipment 131 is any one in the foregoing embodiments of the user equipments of the present invention, and the base station 132 is configured to receive a power consumption preference indication sent by the user equipment, and perform a radio resource parameter configuration for the user equipment in a radio resource management process, where the power consumption preference indication includes a lower power consumption preference indication or a higher power consumption preference indication. The base station is further configured to send at least one of a fourth timer, a fifth timer, a sixth timer, and a seventh timer to the user equipment.

When the user equipment has two states, a default state and a lower power consumption state, the performing, by the base station, a radio resource parameter configuration for the user equipment in a radio resource management process includes: during radio resource management connection setup, configuring, by the base station, two sets of discontinuous reception DRX parameters for the user equipment, and indicating DRX parameters to be used when the user equipment performs a radio resource management connection, where one set of parameters is used to indicate that the user equipment is in the default state, and the other set of parameters is used to indicate that the user equipment is in the lower power consumption state; and configuring, by the base station, two sets of corresponding physical layers for the user equipment according to different discontinuous reception DRX parameters;

or the performing, by the base station, a radio resource parameter configuration for the user equipment in a radio resource management process includes: in a radio resource management reconfiguration process, configuring, by the base station, two sets of discontinuous reception DRX parameters for the user equipment, and indicating DRX parameters to be used after the user equipment completes a radio resource management reconfiguration, where one set of parameters is used to indicate that the user equipment is in the default state, and the other set of parameters is used to indicate that the user equipment is in the lower power consumption state; and configuring, by the base station, two sets of corresponding physical layers for the user equipment according to different discontinuous reception DRX parameters.

In specific implementation, the present invention further provides a computer storage medium, where the computer storage medium may store a program, and when the program is executed, the program may include all or a part of steps in the embodiments of the method for sending signaling or method for determining a power consumption preference according to the present invention. The storage medium may be a magnetic disk, an optical disk, a read only memory (ROM), or a random access memory (RAM), and so on.

Figure 10:
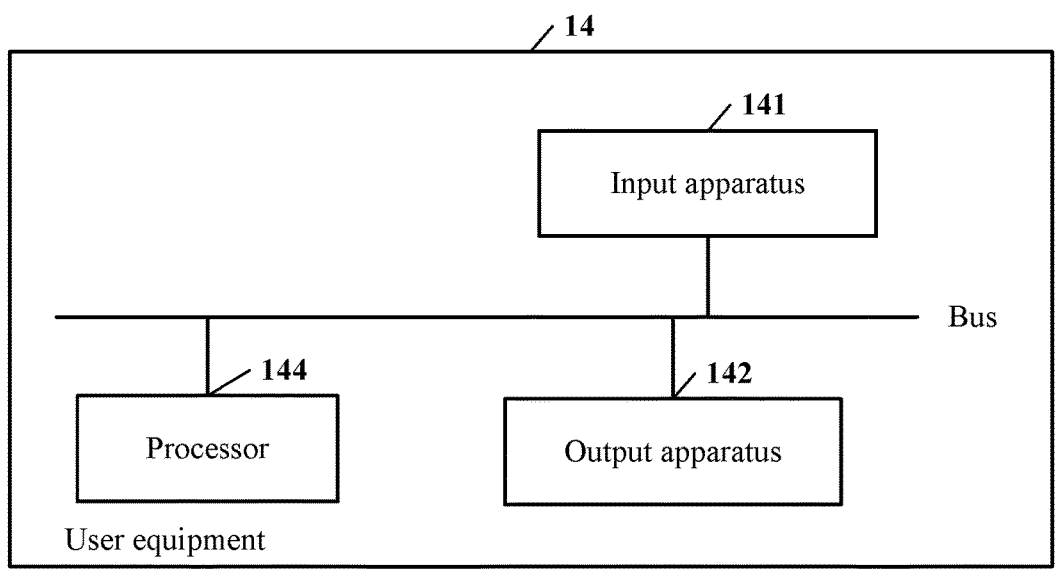
FIG. 10 is a schematic structural diagram of a seventh embodiment of a user equipment according to the present invention.

In specific implementation, as shown in FIG. 10, the present invention further provides a user equipment 14, which may include an input apparatus 141, an output apparatus 142, and a processor 144 (in specific implementation, more than one processor 144 of the user equipment 14 may exist, and an example of only one processor 144 is used for description in FIG. 10), where the processor 144 performs the following steps:

when a power consumption preference of the user equipment is changed to lower power consumption, determining whether a first timer used for restricting sending of a lower power consumption preference indication expires, and if a determination result is yes, instructing the output apparatus 142 to send a lower power consumption preference indication to a base station; and when the power consumption preference of the user equipment is changed to higher power consumption, instructing the output apparatus 142 to send a higher power consumption preference indication to the base station, or determining whether a second timer used for restricting sending of a higher power consumption preference indication expires, and if a determination result is yes, instructing the output apparatus 142 to send a higher power consumption preference indication to the base station.

In some feasible implementation manners, the user equipment has two states, a default state and a lower power consumption state, and therefore the processor 144 further performs the following steps:

when the power consumption preference of the user equipment is changed to lower power consumption, executing a first determination about whether the user equipment is in the default state, and if a determination result of the first determination is yes, executing a second determination about whether the first timer used for restricting sending of a lower power consumption preference indication expires, and if a determination result of the second determination is yes, instructing the output apparatus 142 to send a lower power consumption preference indication to the base station; and when the power consumption preference of the user equipment is changed to higher power consumption, determining whether the user equipment is in the lower power consumption state, and if a determination result is yes, instructing the output apparatus 142 to send a higher power consumption indication to the base station; and when the power consumption preference of the user equipment is changed to higher power consumption, executing a third determination about whether the user equipment is in the lower power consumption state, and if a determination result of the third determination is yes, executing a fourth determination about whether the second timer used for restricting sending of a higher power consumption preference indication expires, and if a determination result of the fourth determination is yes, instructing the output apparatus 142 to send a higher power consumption preference indication to the base station.

In some feasible implementation manners, a method for determining the state of the user equipment by the processor 144 includes:

determining, by the processor 144, the state of the user equipment according to a specified parameter length, and when the parameter length meets a length required by the default state, determining that the user equipment is in the default state, or when the parameter length meets a length required by the lower power consumption state, determining that the user equipment is in the lower power consumption state;

or the method for determining the state of the user equipment by the processor 144 includes:

determining, by the processor 144, the state of the user equipment according to discontinuous reception DRX parameters configured by the base station for the user equipment, and when the user equipment is using discontinuous reception DRX parameters corresponding to the default state, determining that the user equipment is in the default state, or when the user equipment is using discontinuous reception DRX parameters corresponding to the lower power consumption state, determining that the user equipment is in the lower power consumption state.

In some feasible implementation manners, the processor 144 further performs the following steps:

when the determination result of determining whether the first timer expires is no, notifying a protocol layer used for sending a lower power consumption preference indication in the user equipment, to notify a protocol layer used for learning a change of the power consumption preference of the user equipment, that sending of a lower power consumption preference indication is restricted;

or when the determination result of determining whether the first timer expires is no, notifying the user equipment to perform no operations.

In some feasible implementation manners, the processor 144 further performs the following steps:

when the determination result of determining whether the second timer expires is no, notifying a protocol layer used for sending a higher power consumption preference indication in the user equipment, to notify a protocol layer used for learning a change of the power consumption preference of the user equipment, that sending of a higher power consumption preference indication is restricted;

or when the determination result of determining whether the second timer expires is no, notifying the user equipment to perform no operations.

In some feasible implementation manners, after the processor 144 sends a lower power consumption preference indication to the base station or sends a higher power consumption preference indication to the base station, the processor 144 further performs the following steps:

when the user equipment includes the first timer, starting the first timer; and when the user equipment includes the first timer and the second timer, starting the first timer or the second timer or both.

In some feasible implementation manners, the processor 144 further performs the following steps:

when the first timer in the user equipment does not expire, and a radio resource parameter configuration result sent by the base station is received, and when the power consumption preference of the user equipment is changed to lower power consumption again, indicating that the output apparatus 142 is unable to send a lower power consumption preference indication to the base station, until the first timer expires; and when the second timer in the user equipment does not expire, and a radio resource parameter configuration result sent by the base station is received, and when the power consumption preference of the user equipment is changed to higher power consumption again, indicating that the output apparatus 142 is unable to send a higher power consumption preference indication to the base station, until the second timer expires.

In some feasible implementation manners, the processor 144 further performs the following steps:

when the first timer in the user equipment expires, but no radio resource parameter configuration result sent by the base station is received, and when the power consumption preference of the user equipment is changed to lower power consumption again, indicating that the output apparatus 142 is unable to send a lower power consumption preference indication to the base station, until a radio resource parameter configuration result sent by the base station is received; and when the second timer in the user equipment expires, but no radio resource parameter configuration result sent by the base station is received, and the power consumption preference of the user equipment is changed to higher power consumption again, indicating that the output apparatus 142 is unable to send a higher power consumption preference indication to the base station, until a radio resource parameter configuration result sent by the base station is received.

In some feasible implementation manners, the processor 144 further performs the following steps:

receiving a radio resource parameter configuration result sent by the base station;

when the user equipment includes the first timer, starting the first timer; and when the user equipment includes the first timer and the second timer, starting the first timer or the second timer or both.

In some feasible implementation manners, the processor 144 further performs the following step:

when the input apparatus 141 receives a radio resource parameter configuration result sent by the base station, stopping a third timer.

In some feasible implementation manners, a length of the first timer is longer than or equal to a length of the second timer.

In some feasible implementation manners, the processor 144 further performs the following step:

presetting a length of the first timer and a length of the second timer in the user equipment; or receiving a length of the first timer and a length of the second timer that are specified by the base station for the user equipment in a radio resource management connection setup process or a radio resource management connection reconfiguration process.

In some feasible implementation manners, optionally, the processor 144 further performs the following steps: acquiring a fourth timer;

therefore, when the acquired fourth timer expires or the user equipment estimates that a duration of an idle state of the user equipment is longer than or equal to a length of the fourth timer, determining, by the processor, that the power consumption preference of the user equipment is changed to lower power consumption; and acquiring a fifth timer;

therefore, when the fifth timer of the user equipment expires or the user equipment estimates that a duration of an idle state of the user equipment is shorter than or equal to a length of the fifth timer of the user equipment, determining, by the processor, that the power consumption preference of the user equipment is changed to higher power consumption.

In some feasible implementation manners, the acquiring, by the processor 144, a fourth timer specifically includes:

setting, by the processor, the fourth timer according to a sixth timer, or acquiring, by the processor, the fourth timer from the base station, where the sixth timer is a timer set in the base station; and the acquiring, by the processor, a fifth timer specifically includes:

setting, by the processor, the fifth timer according to a seventh timer, or acquiring, by the processor, the fifth timer from the base station, where the seventh timer is a timer set in the base station.

In some feasible implementation manners, the length of the fourth timer is shorter than or equal to a length of the sixth timer, and before the processor 144 sets the fourth timer according to the sixth timer, the processor further performs the following step:

acquiring the sixth timer from the base station, or estimating, according to a message acquired from the base station, the length of the sixth timer set in the base station; and the length of the fifth timer is shorter than or equal to a length of the seventh timer, and before the processor sets the fifth timer according to the seventh timer, the processor further performs the following step:

acquiring the seventh timer from the base station, or estimating, according to a message acquired from the base station, the length of the seventh timer set in the base station.

In some feasible implementation manners, when the processor 144 acquires the fourth timer from the base station, the fourth timer is carried in any one of a radio resource control protocol message, a physical layer message, a data link layer message, and a cell handover message sent by the base station;

when the processor 144 acquires the fifth timer from the base station, the fifth timer is carried in any one of a radio resource control protocol message, a physical layer message, a data link layer message, and a cell handover message sent by the base station;

when the processor 144 acquires the sixth timer from the base station, the sixth timer is carried in any one of a radio resource control protocol message, a physical layer message, a data link layer message, and a cell handover message sent by the base station; and when the processor 144 acquires the seventh timer from the base station, the seventh timer is carried in any one of a radio resource control protocol message, a physical layer message, a data link layer message, and a cell handover message sent by the base station.

It is apparent to persons skilled in the art that various modifications and variations may be made to the present invention without departing from the scope or spirit of the present invention. The present invention shall cover the modifications and variations provided that they fall within the scope of protection defined by the appended claims or equivalents thereof.

What is claimed is:

1. A method for sending signaling comprising:

determining, by a user equipment, that current power preference information is different from a power preference indicated in a last transmission of a message; and determining, that a timer used for restricting sending of a lower power consumption preference indication is expired;

when a power consumption preference of the user equipment is power saving, setting, by the user equipment, power prefer indication to low power consumption; and transmitting, by the user equipment, the power prefer indication to a base station; and when the power consumption preference of the user equipment is not power saving, setting, by the user equipment, the power prefer indication to normal power consumption, and start the timer used for restricting sending of the lower power consumption preference indication; and transmitting, by the user equipment, the power prefer indication to the base station.

2. A non-transitory computer storage medium, wherein the computer storage medium store a program, and when the program is executed by a processor, the program comprise instructions of the method for sending signaling, comprising:

determining, that current power preference information is different from a power preference indicated in a last transmission of a message; and determining, that a timer used for restricting sending of a lower power consumption preference indication is expired;

when a power consumption preference of a user equipment is power saving, setting, power prefer indication to low power consumption; and transmitting, the power prefer indication to a base station; and when the power consumption preference of the user equipment is not power saving, setting, the power prefer indication to normal power consumption, and start the timer used for restricting sending of the lower power consumption preference indication; and transmitting, the power prefer indication to the base station.

3. A user equipment comprising:

a processor; and a memory, having processor-readable codes stored thereon, which when executed causes the processor to implement operations including:

determining, that current power preference information is different from a power preference indicated in a last transmission of a message; and determining, that a timer used for restricting sending of a lower power consumption preference indication is expired;

when a power consumption preference of the user equipment is power saving, setting, power prefer indication to low power consumption; and transmitting, the power prefer indication to a base station; and when the power consumption preference of the user equipment is not power saving, setting, the power prefer indication to normal power consumption, and start the timer used for restricting sending of the lower power consumption preference indication; and transmitting, the power prefer indication to the base station.

\* \* \* \* \*